US011540495B2

(12) United States Patent
Anderson et al.

(10) Patent No.: US 11,540,495 B2
(45) Date of Patent: *Jan. 3, 2023

(54) BEE-BENIGN ARTIFICIAL HONEYCOMB

(71) Applicant: FlowBee Australia Pty Ltd, Newrybar (AU)

(72) Inventors: Cedar Joseph Anderson, New South Wales (AU); Stuart Ralph Anderson, New South Wales (AU)

(73) Assignee: FLOWBEE AUSTRALIA PTY LTD, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/349,292

(22) Filed: Jun. 16, 2021

(65) Prior Publication Data

US 2021/0378217 A1     Dec. 9, 2021

Related U.S. Application Data

(63) Continuation of application No. 15/550,543, filed as application No. PCT/AU2016/050087 on Feb. 12, 2016, now Pat. No. 11,129,369.

(30) Foreign Application Priority Data

Feb. 12, 2015   (AU) ................................ 2015900452
Mar. 27, 2015   (AU) ................................ 2015901124

(51) Int. Cl.
| A01K 47/04 | (2006.01) |
| A01K 59/00 | (2006.01) |
| A01K 47/02 | (2006.01) |
| A01K 47/06 | (2006.01) |

(52) U.S. Cl.
CPC .............. *A01K 47/04* (2013.01); *A01K 47/02* (2013.01); *A01K 47/06* (2013.01); *A01K 59/00* (2013.01)

(58) Field of Classification Search
CPC ........ A01K 47/02; A01K 47/04; A01K 47/06; A01K 59/00; A01K 59/02
USPC ........... 449/5, 35, 42, 44, 53, 54, 55, 63, 64
See application file for complete search history.

(56) References Cited

U.S. PATENT DOCUMENTS

| 2,223,561 A | 12/1940 | Garriga |
| 3,303,519 A * | 2/1967 | Krause .................. A01K 59/00 449/5 |
| 3,840,925 A | 10/1974 | Croan |

(Continued)

FOREIGN PATENT DOCUMENTS

| FR | 20572623 A1 | 5/1986 |
| GB | 592090 | 11/1944 |

(Continued)

*Primary Examiner* — Kathleen I Alker
(74) *Attorney, Agent, or Firm* — DeLio Peterson & Curcio LLC; Brian G. Schlosser

(57) ABSTRACT

A splittable honeycomb comprising: a first comb portion and a second comb portion comprising a first series of cell portions and a corresponding second series of cell portions respectively, said first and second cell portions defining a series of honeycomb cells therebetween, the first comb portion and the second comb portion being moveable relative to each other from a closed cell position to an open cell position, wherein mutually opposed edges of said cells are non-contiguous in the closed cell position to thereby avoid catching a limb of a bee.

13 Claims, 44 Drawing Sheets

(56) References Cited

U.S. PATENT DOCUMENTS

| | | | | |
|---|---|---|---|---|
| 4,234,985 A | * | 11/1980 | Pierce | .................... A01K 47/02 449/43 |
| 11,129,369 B2 | * | 9/2021 | Anderson | .............. A01K 59/00 |
| 2014/0024289 A1 | | 1/2014 | Fendrik | |

FOREIGN PATENT DOCUMENTS

| | | | |
|---|---|---|---|
| KR | 101556288 B1 | * | 10/2015 |
| WO | 2013091018 A1 | | 6/2013 |
| WO | 2015013774 A1 | | 2/2015 |

* cited by examiner

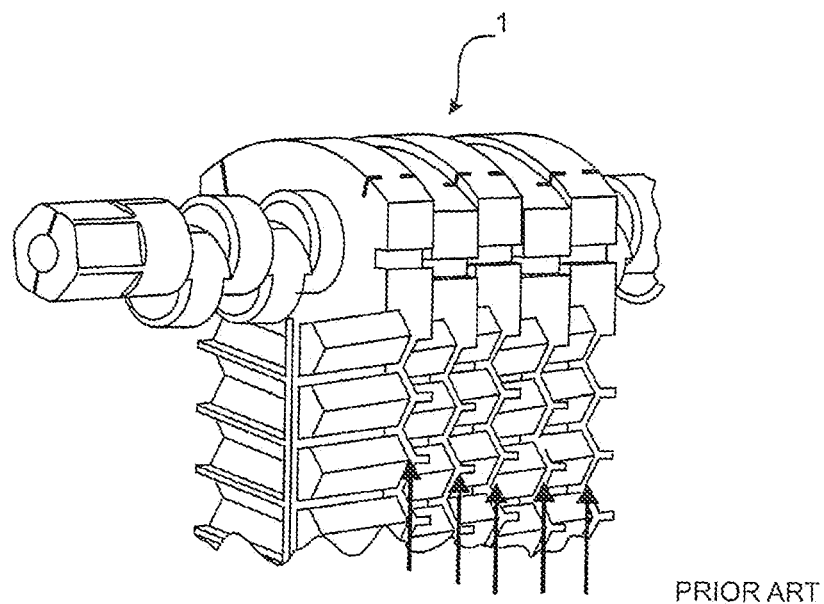
FIG. 1 PRIOR ART
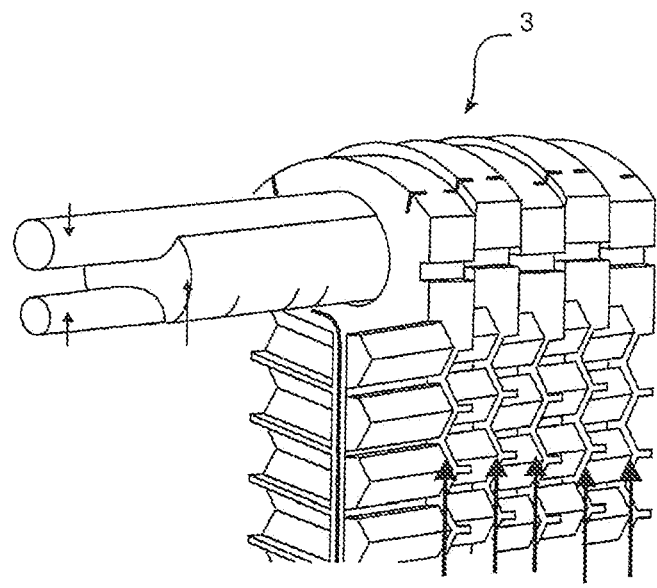
PRIOR ART FIG. 2

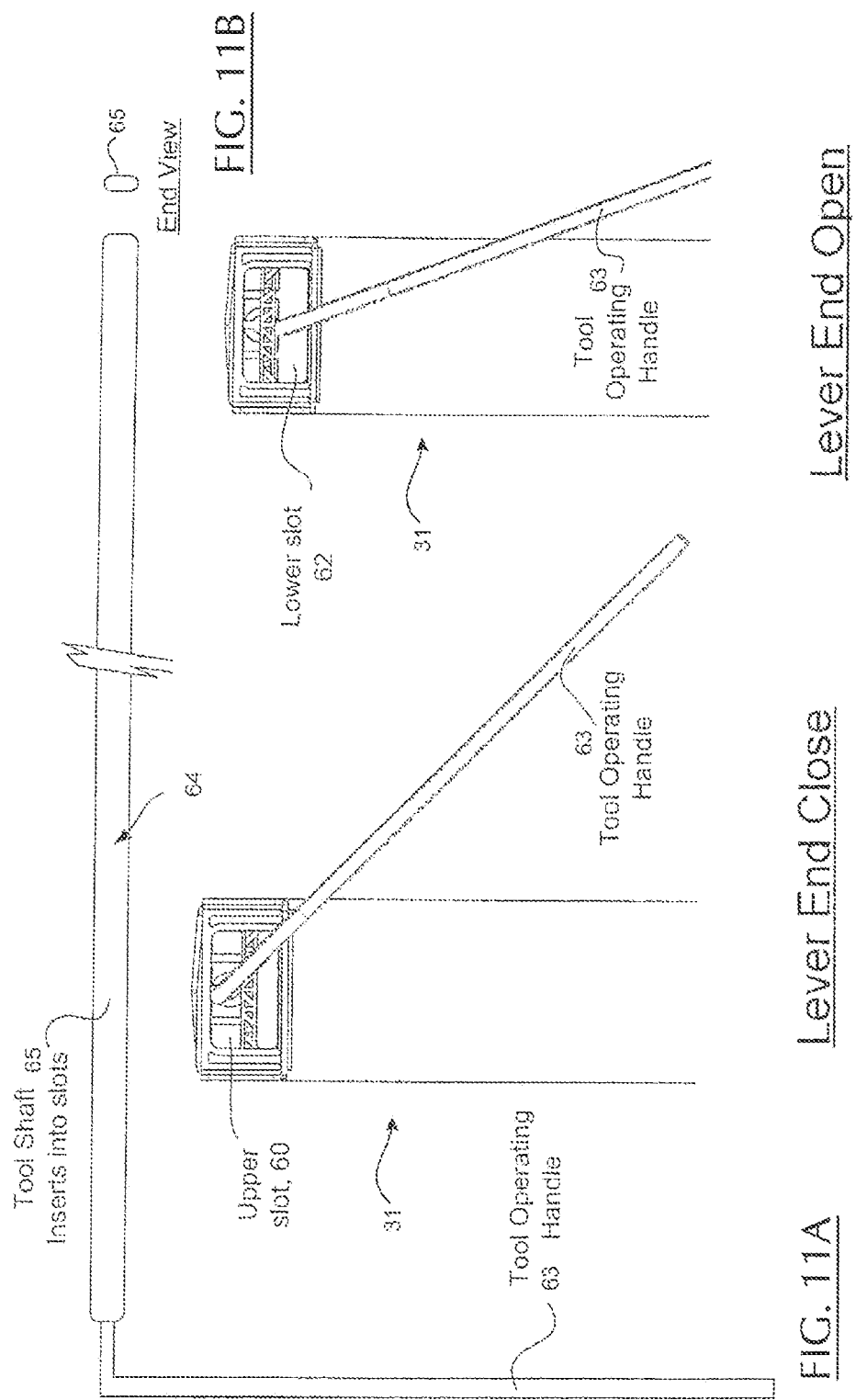

Lever End Close Front

Lever End Open
Front

Airtube End Open

Airtube End Closed

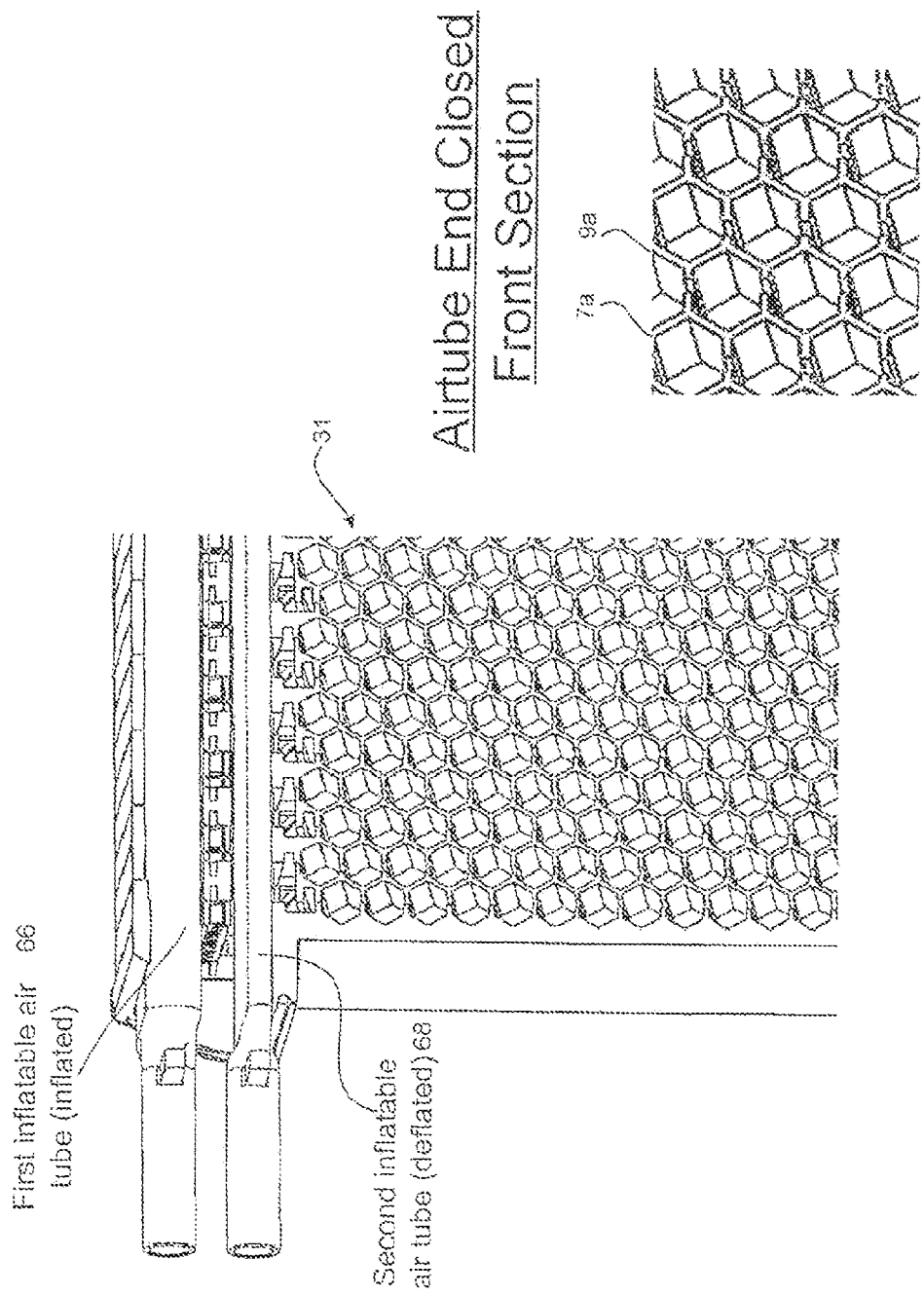

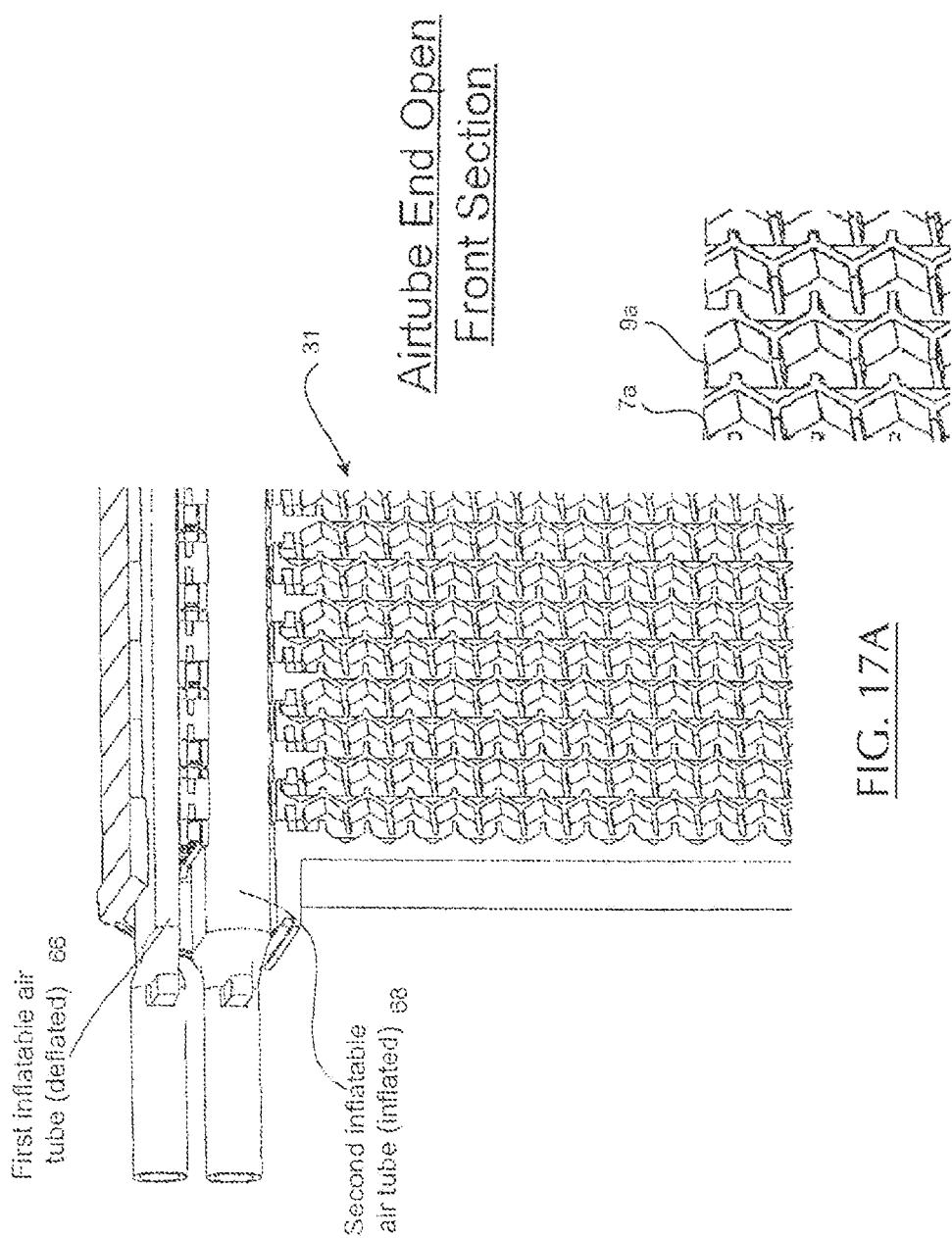

Drain Plug Left

Drain Plug Right

Leak Back Rear View

SECTION VIEW SHOWING WAX
HONEYCOMB DRAWN BY BEES FROM ARTIFICIAL
SPLITTABLE FOUNDATION CELLS

BEE-BENIGN ARTIFICIAL HONEYCOMB

CROSS-REFERENCE TO RELATED APPLICATIONS

This application is a continuation of U.S. patent application Ser. No. 15/550,543, filed Aug. 11, 2017, which is a continuation of International Application No. PCT/AU2016/050087, filed Feb. 12, 2016, and claiming priority to Australian Provisional Application No. 2015900452, filed Feb. 12, 2015, and Australian Provisional Application No. 2015901124, filed Mar. 27, 2015, the contents of both of which are incorporated herein by reference in their entirety.

TECHNICAL FIELD

The present invention relates to an artificial honeycomb arrangement of a type wherein the honeycomb cells can be split or "opened" to harvest honey and then reformed or "closed" for subsequent deposit of honey by bees.

BACKGROUND

Any references to methods, apparatus or documents of the prior art are not to be taken as constituting any evidence or admission that they formed, or form part of the common general knowledge.

A modern beehive comprises various components which fit together to form the hive. Generally, these components will include:

A Hive Stand—The upper hive components rest on this providing a landing board for the bees and helping to protect the Bottom Board from rot and cold transfer;

A Bottom Board—This has an entrance for the bees to get into the hive. This can be screened for ventilation and mite control;

A Brood Box—This is the most bottom box of the hive and is where the queen bee lays her eggs;

A Honey Super—These are the uppermost box(es) where honey is stored;

Frames & Foundation—These are wooden or plastic frames with wax or plastic sheets with honeycomb impression where bees build wax honey combs. Alternatively, the frames and foundation may contain pre-formed plastic honeycombs into which the bees deposit honey;

Outer Cover—This is the outermost housing to provide weather protection for the hive; and Inner Cover—This provides separation from an overly hot or cold Outer Cover and can be used as a shelf for feeding or other purposes.

The honeycomb is a densely packed matrix of hexagonal cells. Bees use the cells to store food (honey and pollen). When a cell is filled, the bees place a wax cap over the end of the cell. The honeycomb is held in a frame which is usually rectangular. Several frames are placed next to each other in the upper part of the hive (the honey super). It is known to provide a plastic (usually polypropylene—but aluminum has also been used) honeycomb formed with the matrix of hexagonal cells. This relieves the bees of the effort required to build wax cells and gives the bees more time to collect honey.

Collection of honey can be very laborious and time consuming. As an example, a common way to collect honey requires the following steps to be carried out: A bee-proof suit needs to be donned; the lid of the hive is opened to expose the honey containing frames. The hive is smoked to calm the bees. A blower is sometimes used to remove bees from the frames. The frames are removed from the hive and transported to a processing center. The cells in the frame need to be uncapped by removing the wax cap. This can be done using an uncapping fork or an uncapping knife. The frames then need to be spun to remove the honey from the cells by centrifugal action. After the honey is removed, the frames are taken back to the hive and replaced (or new frames are inserted). It is estimated that the above time-consuming steps constitute approximately 90% of the beekeeper's time required to collect honey from the hive.

The present inventors have previously addressed the above described problem by providing a honey comb that is described in their international patent application PCT/AU2012/001589. The international patent application discloses an artificial honeycomb which is arranged so that the honeycomb cells may be brought from a closed configuration, in which honey is stored therein, to an open configuration in which the cells of the honeycomb are split and honey is released. Images of exemplary embodiments of this prior artificial honeycomb are reproduced herein in FIGS. 1 and 2. In prior art honeycomb assembly 1 (FIG. 1) the cells may be opened and closed by operation of a rotary crank. In prior art assembly 3 (FIG. 2), inflatable tubes are alternatively filled and deflated to close and open the honeycomb cells.

After "tapping" the honey, the cells are returned to their closed configuration to allow bees to again fill the cells with honey. Honey can therefore be removed without needing to open the hive. The specification and drawings of our international patent application PCT/AU2012/001589 is incorporated herein by cross reference and provides a description of the general operation of the split cells.

The artificial honeycomb comprises first and second plastic comb portions movable relative to each other from a closed position wherein the first and second comb portions define a plurality of partially complete cells, to an open configuration wherein the incomplete cells are split. Each of the two comb portions comprises ½ of the hexagonal side walls. Typically, the first portion is fixed, and the second portion slides up and down between the open and closed positions. An advantage of this cell arrangement is that the cell is partly formed, and the bee only needs to complete the cells, fill the cell with honey and cap the end with wax rather than make the entire cell out of wax first.

A frame can comprise a multiplicity (say 30-80) of first and second comb foundation portions in a side by side relationship. Each first and second comb foundation portions can form 30-100 cells (although this can vary). Thus, a frame can support 900 to several thousand cells. To drain honey from the frame, all the second slideable portions are lifted up (or down) together to break open the cells to enable honey to drain down through the broken cells to the bottom of the frame where the honey is collected to be conveyed to an outlet on the exterior of the super.

A super can contain a multiplicity of such frames in a side by side relationship as is normal. A super can contain between 5-20 frames but this is only given as an example.

To drain an entire super, all the second slideable portions in each frame are moved to break open all the thousands of cells in the frames.

A gap is present between adjacent frames and the gap needs to be wide enough to allow bees to access the open fronted cells but not so wide that the super cannot contain the maximum number of frames. Another reason for a snug fit of the frames is so there are no spaces for pests such as hive beetles to hide from the bees. Thus, problems with pests are minimized and there are no spaces for brace or bur comb to be built. Brace and bur comb is extra comb that bees make in 'open' areas of a hive. These small intrusions of comb makes opening a hive for inspection more difficult and messy. The snug dimensioning of the box relative to the array of frames assists in making the overall combination of the box and the frames robust, which is advantageous for trouble-free transportation.

One disadvantage with the first and second comb portions is that the material used in their construction (for instance plastic) needs to be quite hard to support the honey, and movement of all the second slideable portions relative to the fixed first portions in the super and in an essentially scissor like action can discomfort bees working in the area and possibly snare them. A particularly vulnerable area for bees is the small vertical gap 41 (see FIG. 2) between adjacent frames. This is the gap that bees climb along to deposit honey into a particular cell in the frame. This small gap is defined between the outer edges of the hard plastic cells between adjacent frames.

Draining of a super by sliding all the second portions relative to the first portions in each frame can cause many bees in the gap to be wounded or killed.

For the wellbeing of the hive and in the economic interests of the beekeeper, operating the splittable honeycomb should impact the bees as little as possible. It is an object of the invention to provide an improved artificial honeycomb that reduces injury to bees during collection of the honey.

SUMMARY OF INVENTION

Bee-Benign Artificial Honeycomb

According to a first aspect of the present invention there is provided a splittable honeycomb comprising:

a first comb portion and a second comb portion comprising a first series of cell portions and a corresponding second series of cell portions respectively, said first and second cell portions at least partially defining a series of honeycomb cells therebetween, the first comb portion and the second comb portion being moveable relative to each other from a closed cell position to an open cell position, such that in the closed cell position, the first comb portion and the second comb portion provide mutually opposed edges in registration with each other, wherein, the mutually opposed edges are non-contiguous in the closed cell position to thereby avoid catching a limb of a bee.

In a preferred embodiment of the invention, the mutually opposed edges of the first series of cell portions and the second series of cell portions are shaped to define an outwardly diverging space therebetween. For example, the mutually opposed edges may be angled relative to each other. This provides a V-shaped gap between the mutually opposed edges which will typically vary between about 1 mm to 3 mm. The bees fill the gap with wax when completing the cell. With a gap in the form of a V-cut that tapers toward the rear wall of the cell, the bees are better able to move or retreat out of harm's way as the comb portions are brought back to the closed position.

Preferably, the length of one edge in each of the mutually opposed edges is different to the length of the other edge.

In a preferred embodiment of the invention, the first comb portion is fast with a frame and the second comb portion is moveable relative to the first comb portion, the second comb portion having an outer edge that is inwardly offset relative to a corresponding outer edge of the first comb portion, such that the length of the edges in the mutually opposed edges provided by the second comb portion, are shorter in length than the edges in the mutually opposed edges provided by the first comb portion.

Preferably the first comb portion is formed with a head and a foot wherein the first series of cell portions is disposed between the head and the foot.

Preferably the foot comprises a trough segment to receive honey falling from the series of honeycomb cells in the open cell position.

Preferably the head of the first comb portion includes mating formations on opposed sides thereof for mating with corresponding adjacent first comb portions.

It is also preferred that the foot portion of the first comb portion includes mating formations on opposed sides thereof for mating with corresponding adjacent first comb portions.

In a preferred embodiment of the invention the second comb portion is formed with a head.

It is preferred that the head of the first comb portion defines a first slot and the head of the second comb portion defines a second slot wherein the head of the second comb portion is narrower than the head of the first comb portion, the head of the second comb portion having a header which is disposed across the first slot. This arrangement allows a tool with an elongate shaft and an operating handle to be used for moving the second comb portions relative to the first comb portions by inserting the elongate shaft into the first or second slot and rotating the shaft by manually tuning the operating handle.

According to a further aspect of the present invention there is provided a honeycomb frame comprising a plurality of splittable honeycombs of the previously described type, wherein adjacent trough segments of the first comb portions of said honeycombs are contiguous to thereby form a trough for conveying honey.

It is preferred that at least a front member of the frame is made of a transparent material for ready visual inspection of the interior of the frame.

Preferably the frame is arranged for the trough to drain to an outlet formed on an end of the frame. In a preferred embodiment of the invention, an opening is formed through the trough adjacent the outlet whereby upon the outlet receiving a closure, such as a plug, residual honey in the trough may drain through the opening for consumption by bees.

Narrow-Bladed, Bee-Benign, Splittable Honeycomb

According to another aspect of the present invention, there is provided a method of keeping bees including the steps of:

providing frames of adjacent artificial and splittable honeycombs each defining a plurality of splittable foundation honeycomb cells, wherein the frames are sufficiently spaced from each other for drawing out of the foundation honeycomb cells by the bees to form wax cells thereon; and subsequent to the bees drawing out the wax cells and filling the cells with honey, moving portions of the splittable honeycombs relative to other portions thereof in order to split the foundation honeycomb cells to thereby release the honey.

According to another aspect of the present invention there is provided a frame for a honey super, the frame comprising a plurality of first comb foundation portions and a plurality of second comb foundation portions which can move relative to each other between a closed cell forming portion and an open cell draining portion, the first and second portions together comprising the rear wall of a cell and less than the full length of the cell.

Each comb (which can be called a flow comb) does not extend the full length of a cell. Thus, bees will draw out the cell to its full length in the usual manner using natural comb material (wax). The length of the fully formed cell will usually be between 15-25 mm but this can vary.

Suitably, the first and second portions provide a cell wall length of between 3 mm and 10 mm and preferably about 5 mm to 7 mm. This part of the cell can therefore comprise the harder and stronger artificial material with the bees completing the remainder of the cell length using natural comb which is a softer material.

Suitably, the first portion comprises a central spine and oppositely extending cell wall portions. Suitably, part of the central spine comprises part of the rear wall of the cell.

Suitably, the second portion comprises a central spine and oppositely extending cell wall portions. Suitably, part of the central spine comprises part of the rear wall of the cell.

Suitably, the part of the central spine of the first portion and the second portion comprise the entire rear wall of the cell.

In a particularly preferred embodiment, the spine of the first portion and the second portion each has a thickness of about 2 mm to 3 mm and each oppositely extending cell wall part has a length of about 5 mm to 7 mm thereby making the entire width of the comb about 13 mm to 16 mm across.

The honey can be drained by moving the artificial parts of the cell relative to each other to break this part of the cell wall (that is, the artificial part). The natural part of the cell wall (that is the part extending from the end of the artificial part to the open end of the hexagonal cell) may also break or split but even if it does not and instead stretches or deforms, the honey can still drain down the frame from upper cells and down through lower cells to a collection area at the base of the super by the openings caused by separation of the artificial parts of the comb. The honey drains along a slightly serpentine, but generally vertical flow path out of the honeycomb. The relatively tall column of honey generates significant hydrostatic pressure at the lower regions of the honeycomb to increase the flow rate.

An advantage of this arrangement is that there are no hard edges bordering the small gap between frames. Instead, this gap is bordered by the softer natural wax made by the bees to complete the cells. Thus, there is less injury, if any, to bees during the super draining step.

It may be advantageous to have some of the cell's full length with the harder artificial material possibly to provide some rigidity, but a majority of the cells will be cut down in length, for instance to about 6 mm.

The harder artificial parts of the cell may be formed from plastics, aluminium, natural materials such as bioplastics, plant based plastics, cellulose plastics and cellulose composite materials, bamboo, wood, wood composites, manufactured wood, compressed sawdust, and the like.

To provide additional safety to the bees, it is preferred that the first and second comb portions do not abut each other when in the cell forming (filling) position. Instead, it is preferred that there is a small gap that the bees can bridge with wax. The gap need not be large but should be sufficient to avoid catching a limb of a bee. In the absence of such a gap, the scissor like movement between the comb portions can sever or damage the legs of bees in the immediate area. As discussed above, the small gap can reduce such injury. The gap can be about 1 mm to 3 mm in width and will be bridged over by a bee and with a softer wax. A V-cut gap is easier for a bee to move out of harm's way as the comb portions close the cell.

This narrow-bladed embodiment of the invention may also have heads on the first and second comb portions to form first and second slots. The head on the second portion has a header across the first slot so that the second portions can be moved relative to the first portion with the aid of a tool as described above in relation to the wider-bladed artificial honeycomb.

Similarly, the narrow-bladed honeycomb has first comb portions that each has a foot at the lower ends. The feet are contiguous to form a trough for draining the honey to an outlet. The outlet has a closure such as a plug, and the closure and outlet are configured to provide an opening to allow residual honey to leak from the trough for consumption by the bees.

According to another aspect of the present invention, there is provided a plurality of frames of splittable artificial honeycombs each artificial honeycomb providing splittable partial cells wherein adjacent frames are sufficiently spaced from each other for bees to use the partial cells as a foundation and draw out the partial cells with wax to form complete cells.

Fluidic Actuation of Artificial Splittable Honeycomb

In one embodiment of the invention, first and second inflatable bladders are disposed along the first and second slots whereby inflation of the first bladder causes the second comb portions to assume the open cell position and inflation of the second bladder causes the second comb portions to assume the closed cell position.

Manual Actuation of Artificial Splittable Honeycomb

In another embodiment of the invention, the frame includes a tool having an elongate shaft with an actuation handle attached thereto, wherein the elongate shaft is disposed through the first or the second slots and arranged for moving the second comb portions relative to the first comb portions by manual actuation.

In a further embodiment of the invention the frame includes a tool comprising a pair of elongate shafts with operation handles attached to each of the shafts respectively, wherein the elongate shafts are disposed through the first or second slots and arranged for moving the second movable honeycomb portions relative to the first fixed honeycomb portions upon concerted squeezing of the handles together.

In another embodiment of the invention the frame includes a tool comprising a pair of elongate flexible rods with operation handles attached to each of the rods respectively, wherein the elongate flexible rods are disposed through the first or second slots and wherein upon operating the operation handles to thereby twist one rod over the other rod, move the second comb portions relative to the first comb portions.

Beehive Box with Viewing Spaces for Visual Inspections

According to a further aspect of the present invention there is provided a beehive box housing an array of the honeycomb frames wherein the beehive box includes a number of inspection spaces for viewing and accessing one or more of the frames. Preferably, the box is provided with a number of removable panels for selectively closing the inspection spaces.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 1 and 2 depict portions of prior art, artificial, splittable, honeycomb assemblies according to the prior art.

FIG. 11*a* is a front elevation of a tool for moving the second comb portion from the open position to the closed position and vice versa.

FIG. 11*b* is an end elevation of only the shaft of the tool shown in FIG. 11*a*.

FIGS. 12*a* and 12*b* illustrate the use of the tool shown in FIGS. 11*a* and 11*b*.

FIGS. 15*a*, 15*b*, 16*a*, 16*b*, 17*a* and 17*b* illustrate first and second elongate bladders (and their use) for moving the second honeycomb portions from the closed to the open position and vice versa.

DETAILED DESCRIPTION

Bee-Benign Artificial Honeycomb

Figure 3:
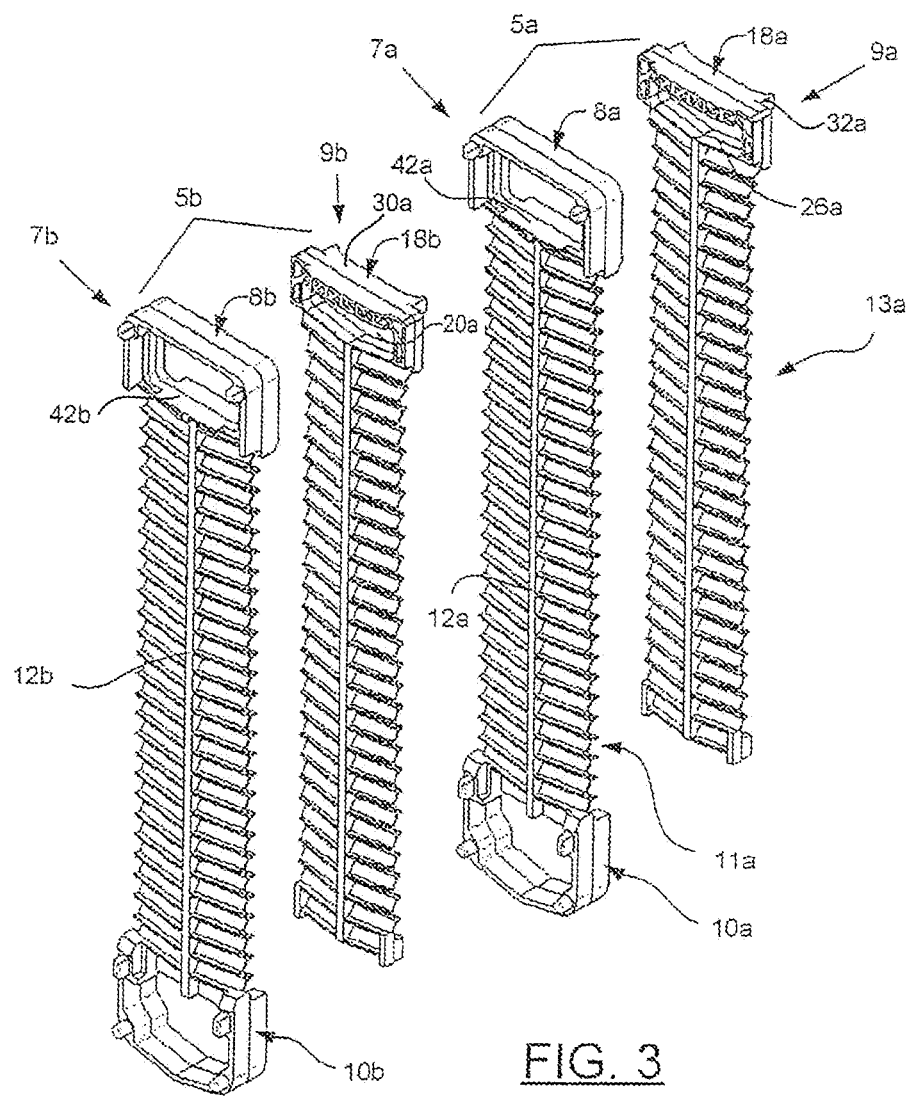
FIG. 3 is an exploded perspective view of two honeycomb assemblies, each according to a preferred embodiment of the present invention.

FIG. 3 is an exploded perspective of two adjacent splittable honeycomb assemblies 5*a*, 5*b*, each according to a preferred embodiment of the present invention. The honeycomb assemblies 5*a*, 5*b* are identical. With reference to honeycomb assembly 5*a*, it is comprised of a first fixed comb portion 7*a* and a second movable comb portion 9*a*. FIGS. 4*a* to 4*d* present various views of the first comb portion 7*a* whilst FIGS. 5*a* to 5*d* present various views of the second comb portion 9*a*.

The first comb portion is formed with a head 8*a* and a foot 10*a*. A first series of cell portions 11*a* is disposed between the head and the foot. Each cell portion of the series of cell portions 11*a* slants downwards from their opposed outer edges to a longitudinal, medial rib 12*a*. Slanting the cell portions in this manner assists in retaining honey within the honeycomb in use. The medial rib 12*a* has outer longitudinal sides that extend just proud of the first series of cell portions 11*a*.

Figure 8:
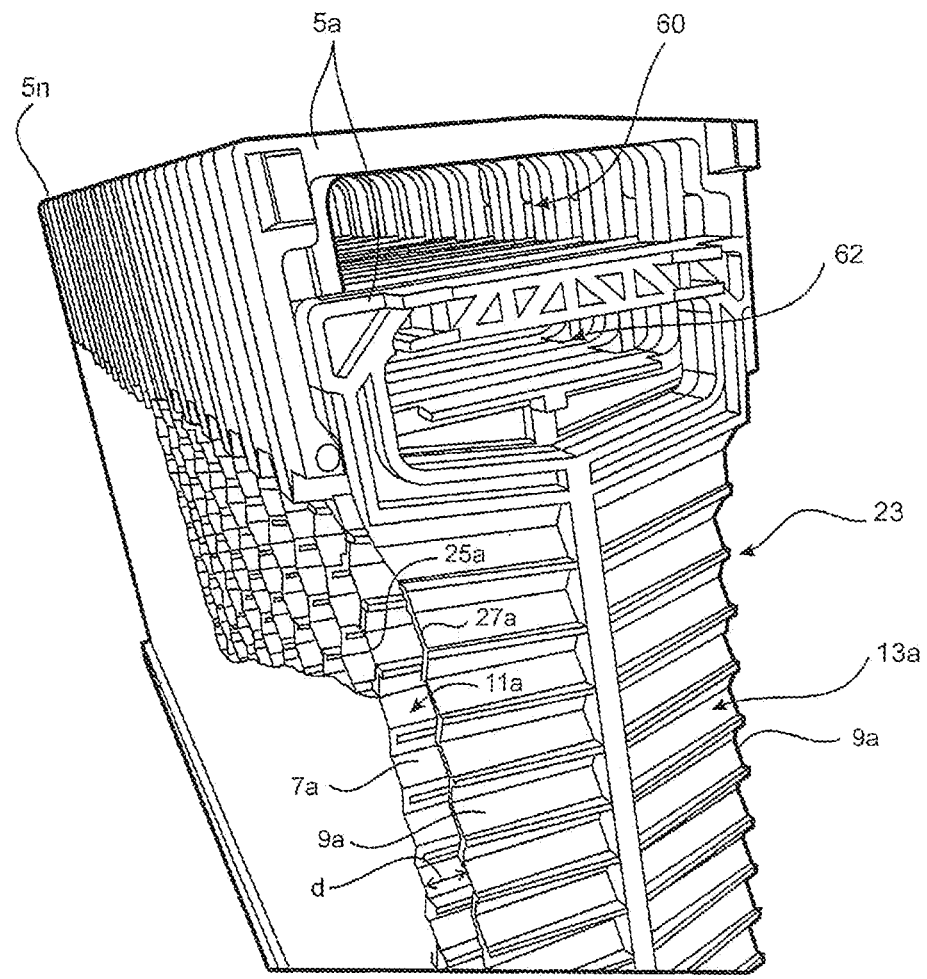
FIG. 8 is a perspective view of a honeycomb comprising a plurality of honeycomb assemblies of the type depicted in FIG. 3.

The head 8*a* and foot 10*a* of the first comb portion 7*a* includes mating formations on opposed sides thereof in the form of plugs 14*a* and complementary sockets 16*a* for mating with corresponding plugs and sockets of adjacent first comb portions. Consequently, a plurality of first honeycomb portions $5a, \ldots, 5n$ can be fastened to each other as shown in the perspective of FIG. 8.

Referring now to FIGS. 5a to 5d, the second comb portion 9a is formed with a head 18a which is narrower than the head 8a of the first honeycomb portion 7a. The head 18a of the second comb portion 9a includes a central opening 20 that is defined by opposed vertical jambs 22a and 24a, a sill 26a, and a header 28a. The header 28a is formed with front and rear protrusions 30a, 32a.

Figure 4:
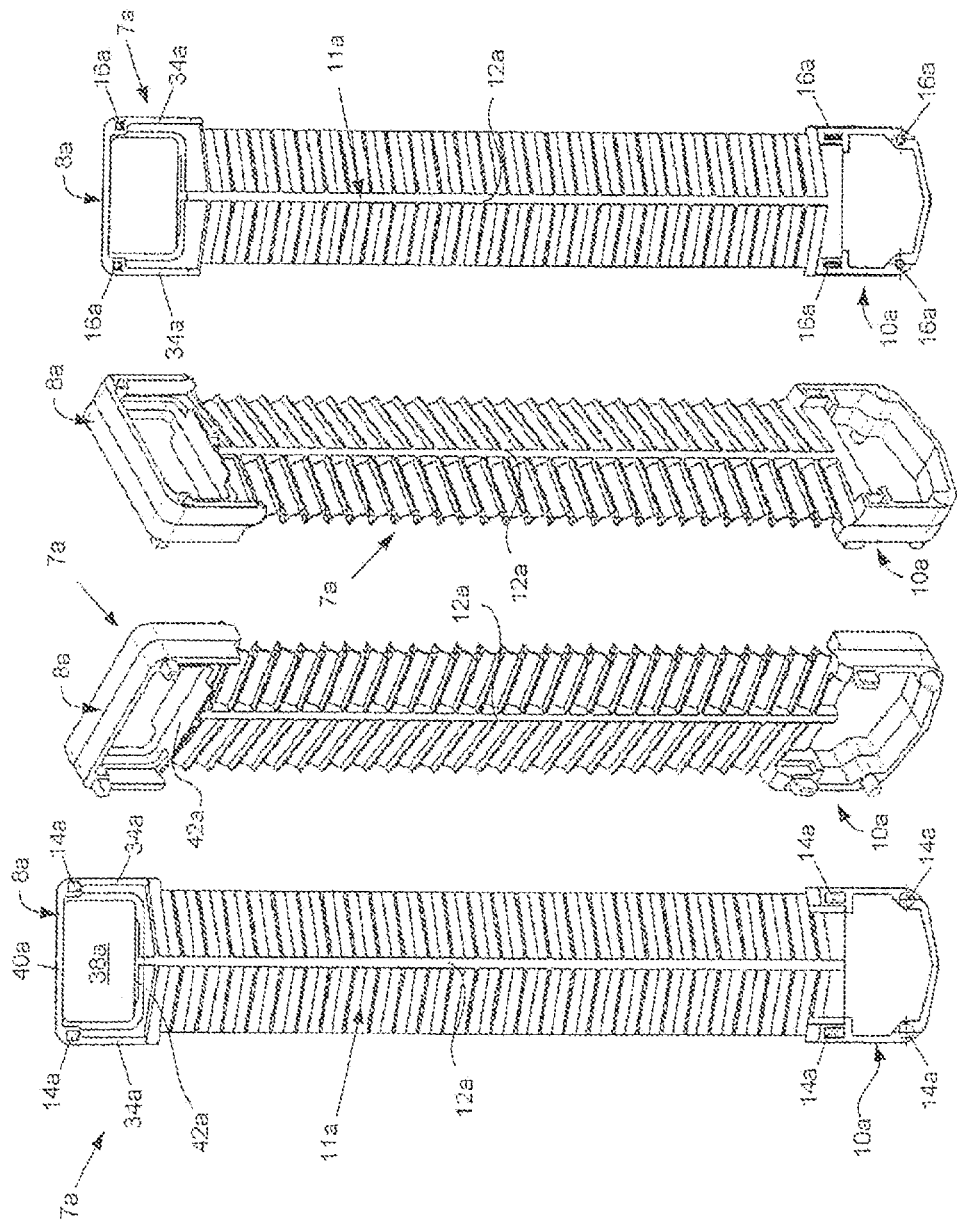
FIGS. 4*a* to 4*d* are front, front perspective, rear perspective and rear views of a first, fixed portion of the first honeycomb assembly of FIG. 3.
Figure 5:
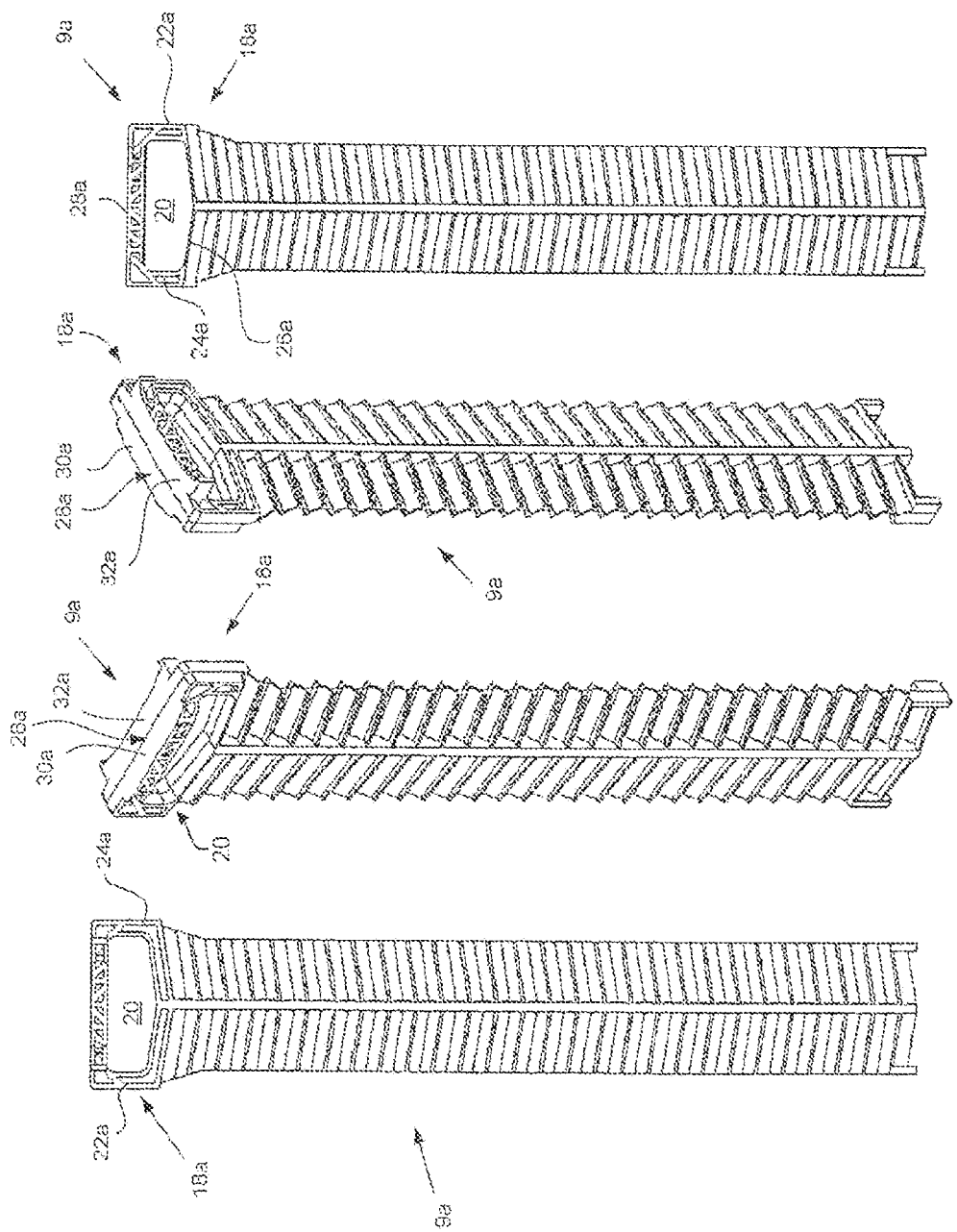
FIGS. 5*a* to 5*d* are front, front perspective, rear perspective and rear views of a second, movable portion of the first honeycomb assembly of FIG. 3.

As shown in FIG. 4a, the head 8a of the first comb portion 7a includes a central window 38a that is defined by header 40a, and front and rear vertical side rails 34a. A sill 42a extends forwardly and rearwardly along the bottom of the window 38a.

Referring again to FIG. 3, upon first comb portions 7a and 7b being brought together the intermediate second comb portion 9b is sandwiched therebetween. The head 18a of the second (movable) comb portion locates against the heads 8a and 8b of the first comb portions 7a and 7b with the sills 42a, 42b of the first comb portions extending into window 20a of the second comb portion 9b. As the second (movable) comb portion 9a is slid upward, the top of sill 26a abuts the underside of the sills 42a, and 42b, of the first comb portions 7a, 7b. Alternatively, as the second comb portion 9a is slid downward, the underside of the header protrusions 30a and 32a of the second comb portion abut the topside of the sill 42a and 42b of the first header protrusions. The protrusions and sills are positioned to limit the travel of the second (movable) comb portion 9a and 9b to half a honeycomb cell height, i.e., between open and closed positions.

Figure 6:
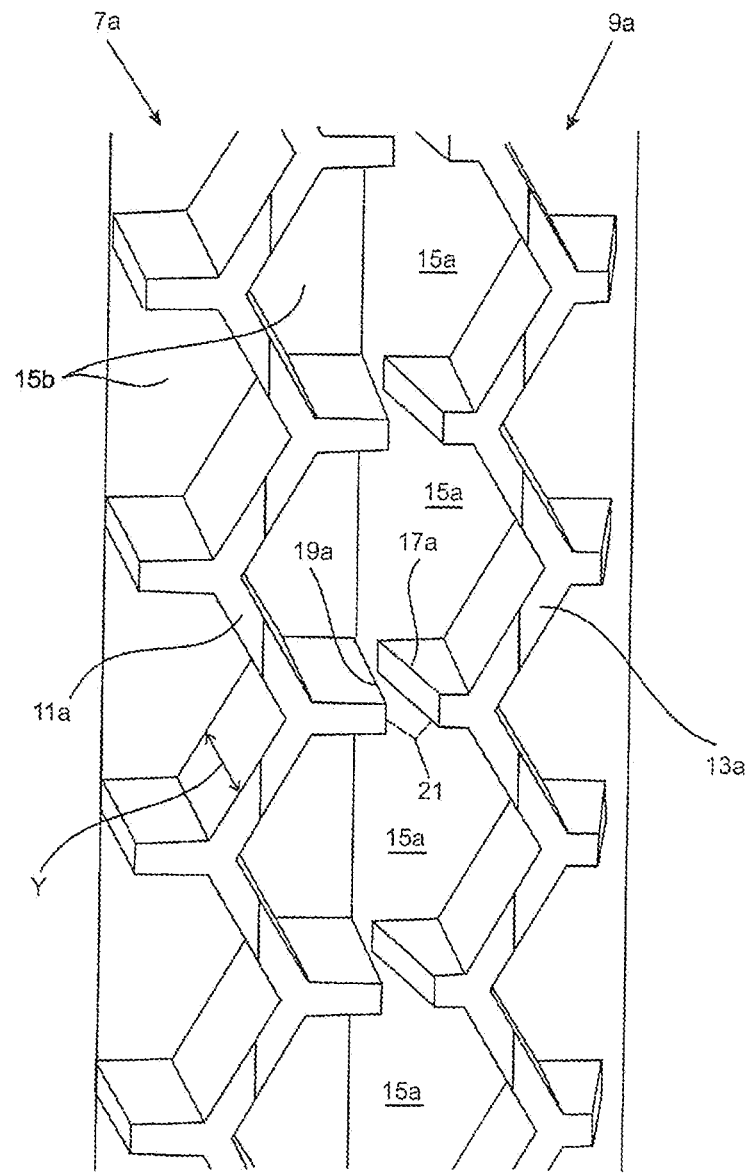
FIG. 6 is an enlarged, partial side perspective of the first and second honeycomb portions wherein the second movable portion has been moved to the closed position relative to the first honeycomb portion to thereby define a vertical series of honeycomb cells.

Referring again to FIG. 3, the first comb portion 7a is formed with a first series of cell portions 11a and similarly the second comb portion 9a is formed with a corresponding second series of cell portions 13a. As best seen in FIG. 6, the first and second cell portions 11a and 13a define a series of honeycomb cells 15a therebetween.

Figure 7:
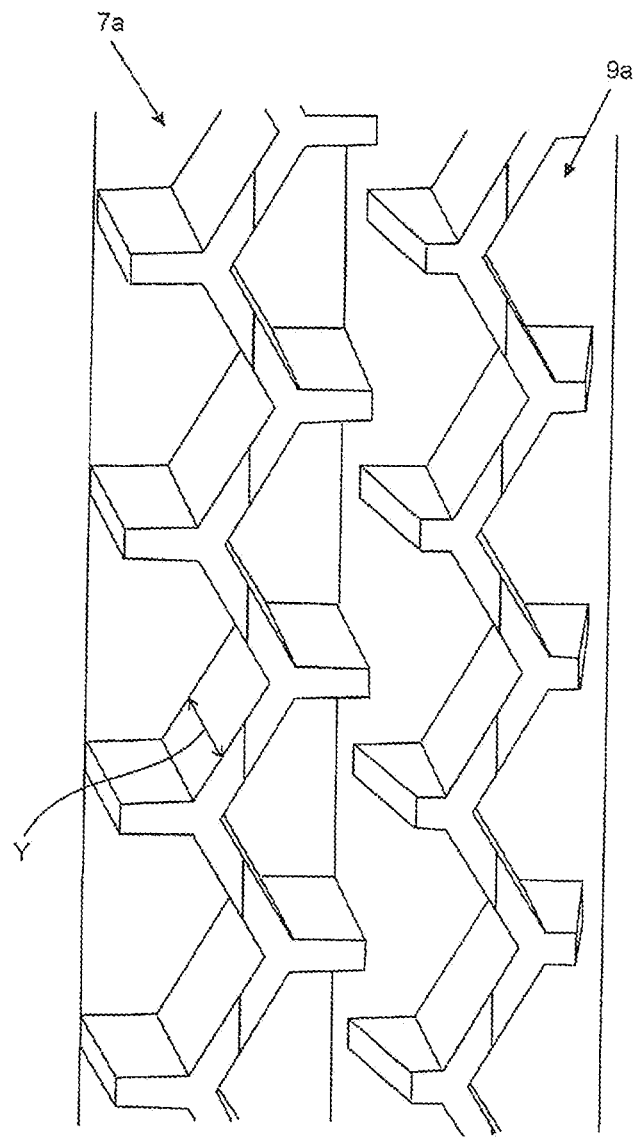
FIG. 7 is a detail of the sides of the first and second honeycomb portions wherein the second movable portion has been moved to an open position relative to the first honeycomb portion to thereby define a vertical series of split honeycomb cells.

The first comb portion 7a and the second comb portion 9a are moveable relative to each other between a closed cell position as shown in FIG. 6 wherein each of the series of honeycomb cells 15a are closed, and an open cell position as shown in FIG. 7. Referring back to FIG. 3, the first comb portion 7a is fixed to adjacent first comb portion 7b and the second comb portion 9a can be slid about half a cell height up and down relative to the first comb portion 7a to thereby form or split the honeycomb cells.

The Inventors have discovered that the use of prior art artificial honeycomb may be injurious to bees. More particularly, the Inventors have discovered that when operating prior art honeycombs similar to those of FIGS. 1 and 2, that as sliding portions of the honeycomb are slid over the fixed portions, particularly from the open to the closed position, limbs of bees may be caught between the first series of cell portions and the second series of cell portions.

In order to address this problem and provide a more benign artificial, splittable honeycomb, mutually opposed edges 17a and 19a (shown in FIG. 6) forming the cells 15a are non-contiguous in the closed cell position shown in FIG. 6 to thereby avoid catching the bee limbs.

The mutually opposed edges 17a, 19a of the first series of cell portions 11a and the second series of cell portions 13a are shaped to define a space 21 therebetween. For example, one or both of the said opposed edges may be angled relative to each other as shown in FIG. 6 to produce an outwardly diverging space 21 therebetween.

Whilst the first and second comb portions are in the closed position shown in FIG. 6 the bees fill the space 21 with wax in order that honey can be contained within the cells. Consequently, upon the second comb portion 9a being slid relative to the first comb portion 7a the limbs of the bees are not caught between the edges 19a, 17a of the first series of cell portions 11a and the second series of cell portions 13a.

FIG. 8 shows a plurality of the splittable honeycomb assemblies $5a, \ldots, 5n$ (where 'n' indicates an arbitrarily selected total number of honeycomb assemblies) positioned against each other to form a splittable honeycomb 23 for mounting in a honeycomb frame.

It will be seen that the outer edge 25a of the first comb portion 7a and the outer edge 27a of the second comb portion 9a are offset relative to each other a distance "d". More particularly the outer edge 27a of the second comb portion 9a is recessed, or "stepped back" by the distance "d" relative to the outer edge 25a of the first comb portion 7a. Similarly, for each honeycomb assembly 5a to 5n, the edge of each of the second (movable) comb portions is stepped back a distance "d" relative to the edge of its associated first (fixed) comb portion. In use, the bees add wax to the outer edges 27a to 27n of the second combs 9a to 9n to effectively extend the outer edges 27a to 27n of the second (movable) comb portions through the distance "d" so that they are about flush with the outer edges 25a to 25n of the first (fixed) comb portions 5a to 5n.

Figure 9:
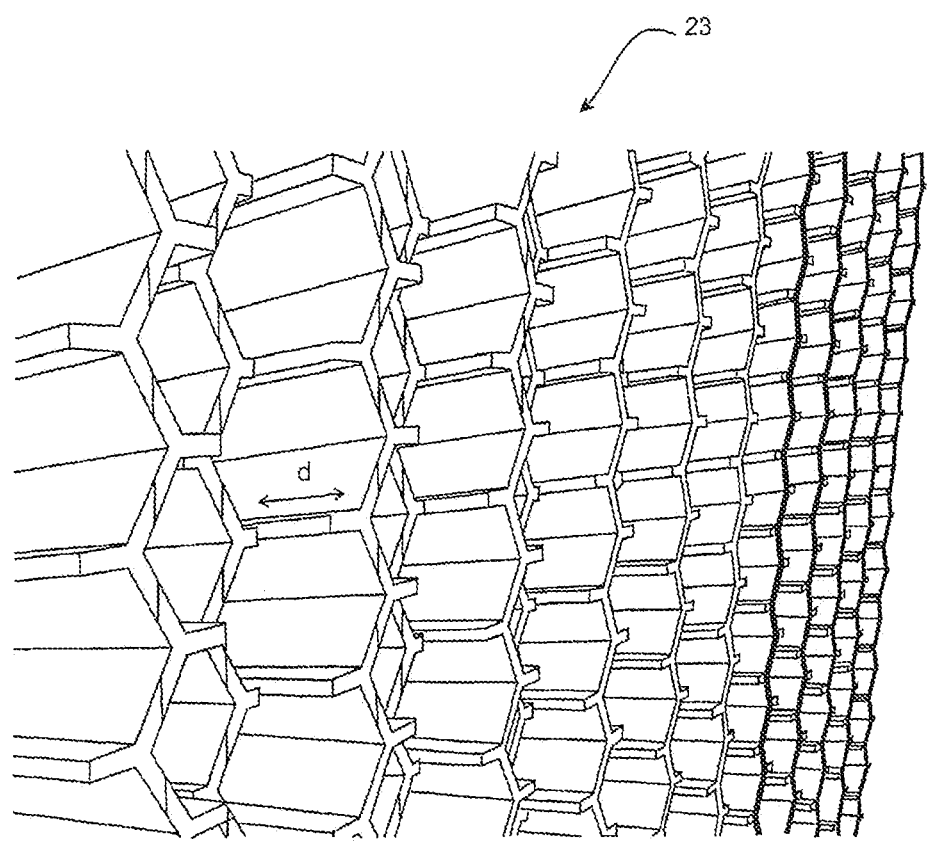
FIG. 9 is an enlarged partial perspective view of the honeycomb assembly of FIG. 8 showing how the second, movable, honeycomb portions have borders that are stepped in a distance "d" relative to the first, fixed, honeycomb portions.

Consequently, upon the second (movable) comb portions being slid to the cell open position, the honeycomb exterior that the bees stand upon is less likely to be disturbed as the moving second portions of each of the honeycombs making up the honeycomb assembly are deeper in the comb. In effect, by stepping back the outer edges of the second (movable) honeycomb portions the bees are encouraged to build a wax bridge between adjacent first (fixed) honeycomb portions. This results in fewer disturbances to the bees because the wax bridges provide support for the bees during the sliding of the second portion of the honeycomb. The wax bridges also ensure that less honey dribbles down the outside of the honeycomb assembly. FIG. 9 is a further view of the side of the honeycomb assembly 23 indicating the offset distance "d".

Figure 10A:
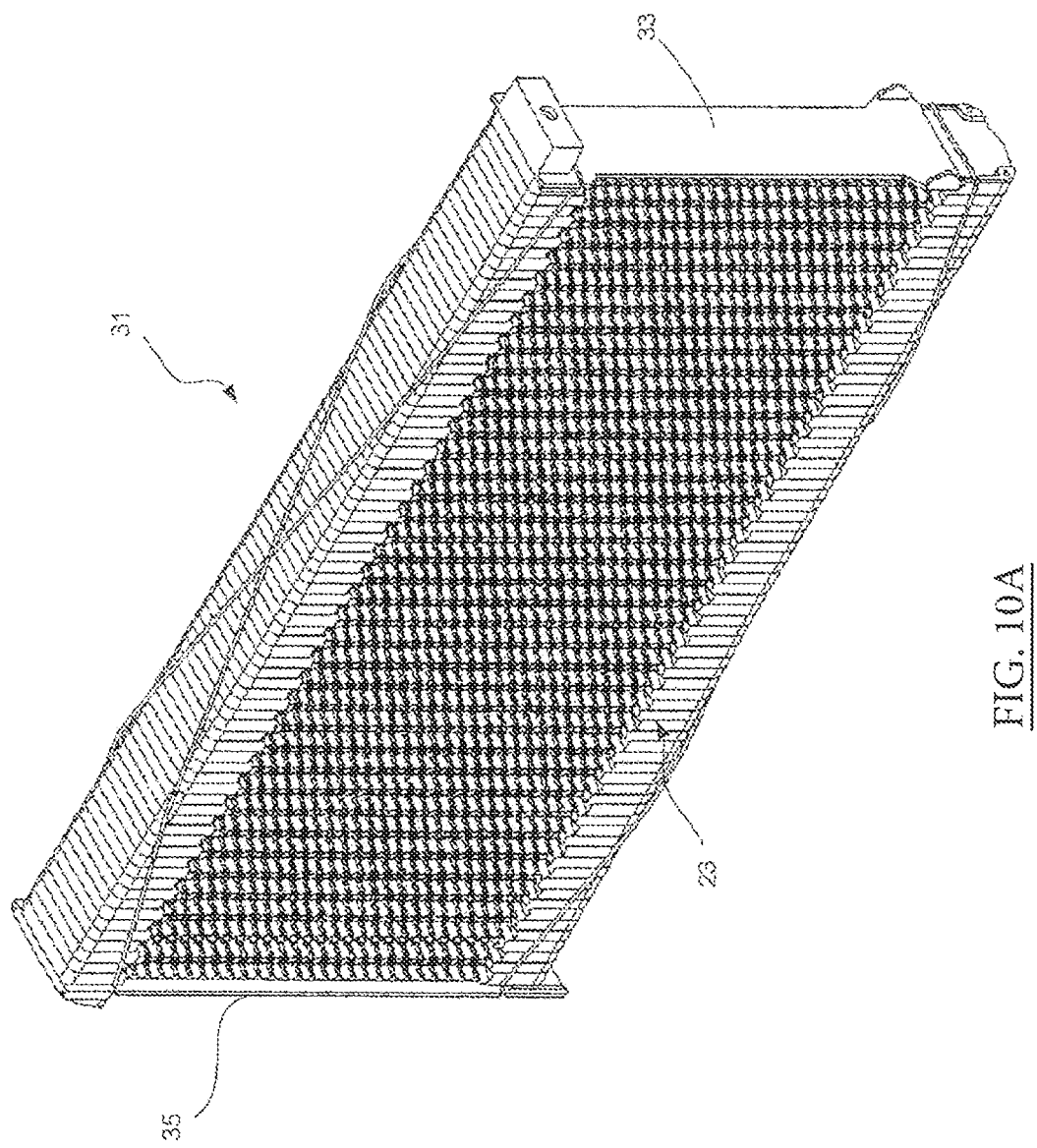
FIG. 10*a* is a perspective view of a honeycomb frame incorporating the honeycomb of FIG. 8.
Figure 10E:
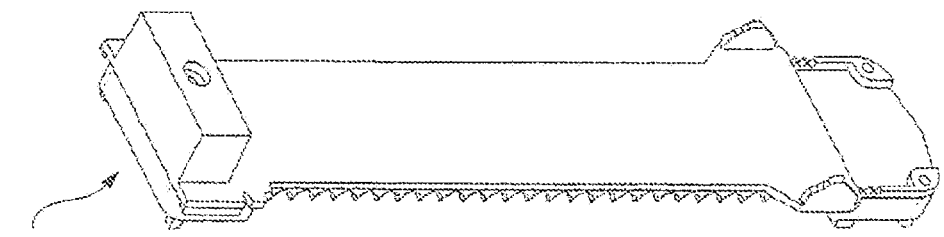
FIGS. 10*d* and 10*e* are front and rear perspective views of the rear-most honeycomb portion of the frame shown in FIG. 10*a*.
Figure 10D:
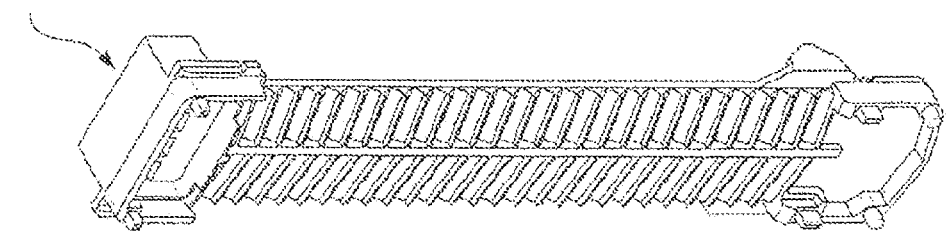
Figure 10C:
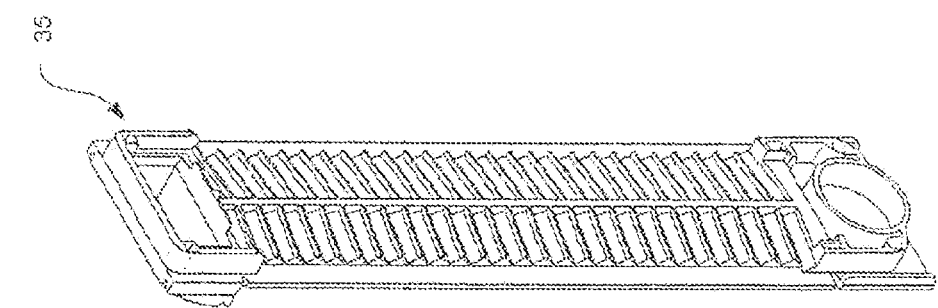
FIGS. 10*b* and 10*c* are front and rear perspective views of the front-most honeycomb portion of the frame shown in FIG. 10*a*.
Figure 10B:
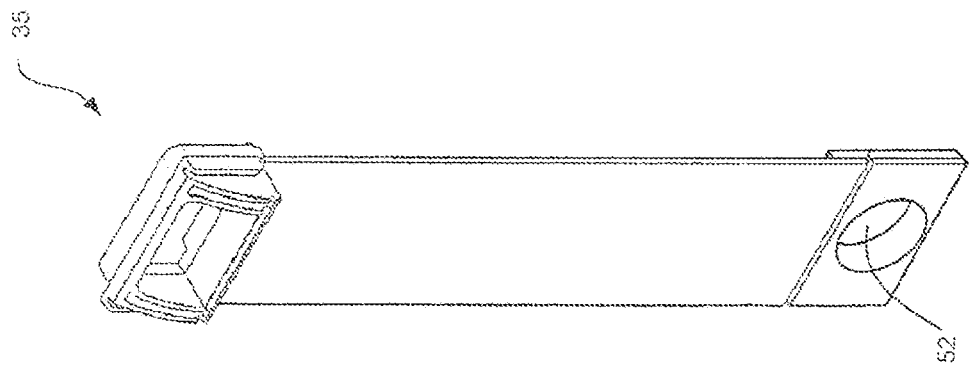

Referring now to FIG. 10a, there is depicted a frame 31 according to a preferred embodiment of an aspect of the present invention. The frame 31 comprises the honeycomb 23 of FIG. 8 with a rear end plate 33 and a front plate 35. FIGS. 10b and 10c show the front and the rear of the front plate 35 whilst FIGS. 10d and 10e illustrate the front and the rear of the rear plate 33.

Figure 10F:
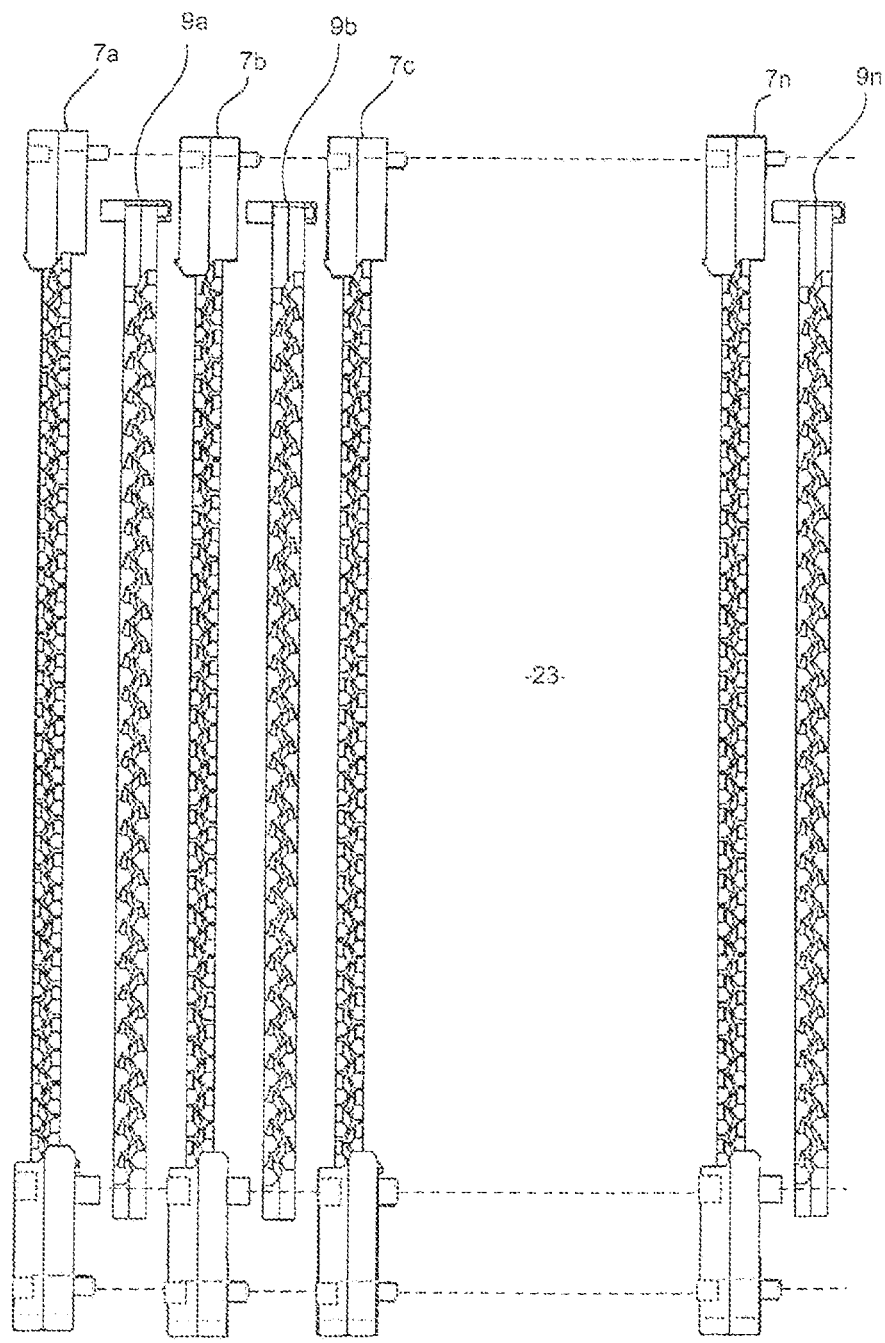
FIG. 10*f* is a partial, exploded side view of the honeycomb assemblies of FIG. 8 wherein the second, movable, honeycomb portions are in the closed position.
Figure 10G:
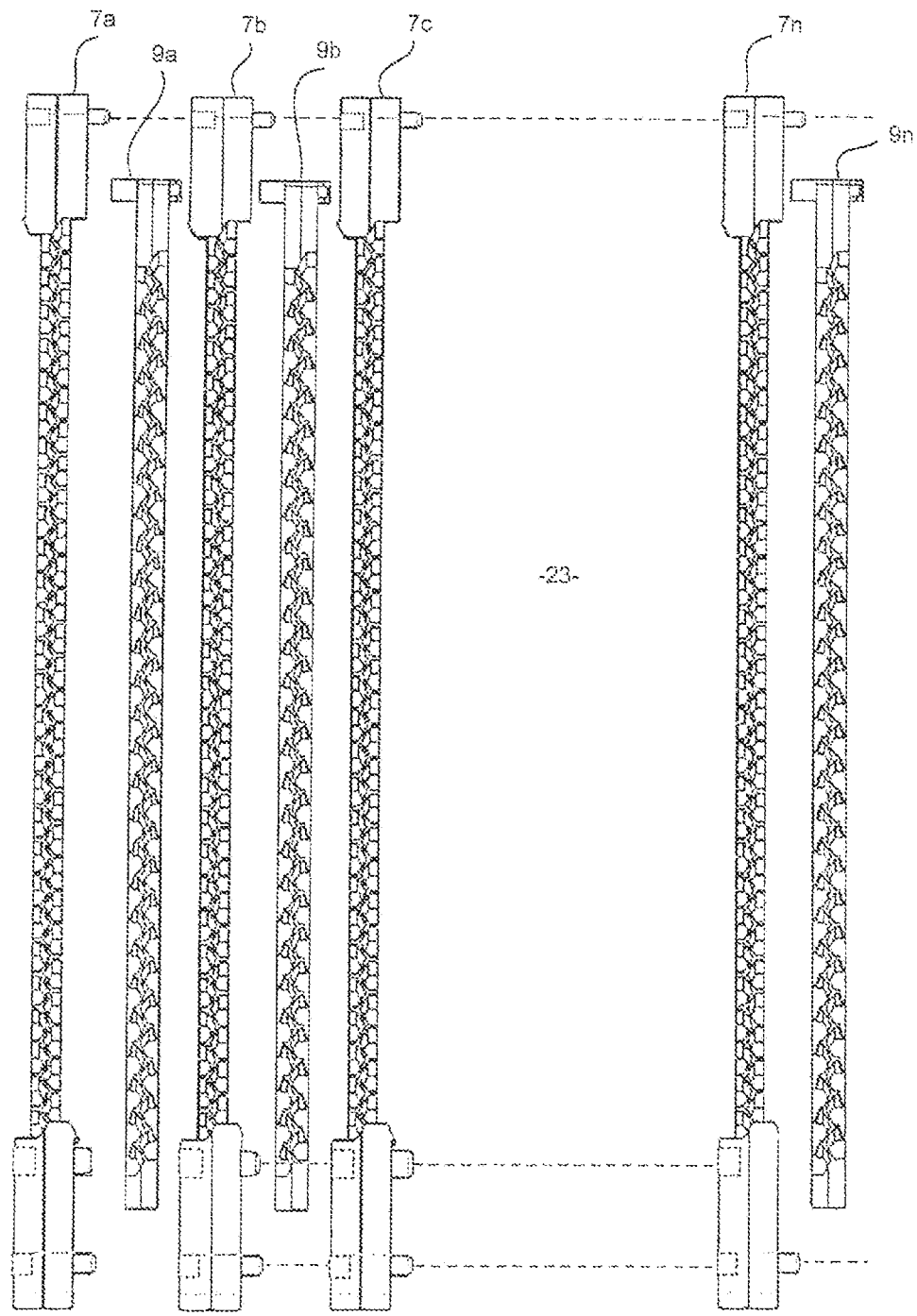
FIG. 10*g* is a partial, exploded side view of the honeycomb assemblies of FIG. 8 wherein the second, movable, honeycomb portions are in the open position.

FIGS. 10f and 10g are exploded side views of the honeycomb assembly with the second (movable) honeycomb portions in respectively closed (FIG. 10f) and open (FIG. 10g) positions. To recap, the first (fixed) comb portions $7a, \ldots, 7n$ are interlocked to their neighbors and each of the second comb portions $9a, \ldots, 9n$ is moveable relative to adjacent first comb portions on either side.

As best shown in FIG. 8, the heads of the first honeycomb portions $7a, \ldots, 7n$ define a first slot 60 and the heads of the second honeycomb portions $9a, \ldots, 9n$ define a second slot 62 wherein the second head is narrower than the first head and wherein headers of the second heads are disposed across the first slot. By inserting a suitable tool into the first slot above the headers of the second honeycomb portions it is possible to lower the second honeycomb portions by forcing the headers of the second honeycomb portions $9a, \ldots, 9n$ downward with purchase against the underside of the headers of the first honeycomb portions $7a, \ldots, 7n$. Alternatively, by inserting a suitable tool into the second slot, below the headers of the second honeycomb portions, it is possible to raise the second honeycomb portions.

Consequently, it is possible to open or close the honeycomb cells. FIGS. 11a to 22 illustrate suitable tools in the form of levers, pneumatic tools and twisting tools.

Any suitable tool or mechanism that can apply the force to displace second honeycomb portions from the first honeycomb portions could be used.

Figure 13A:
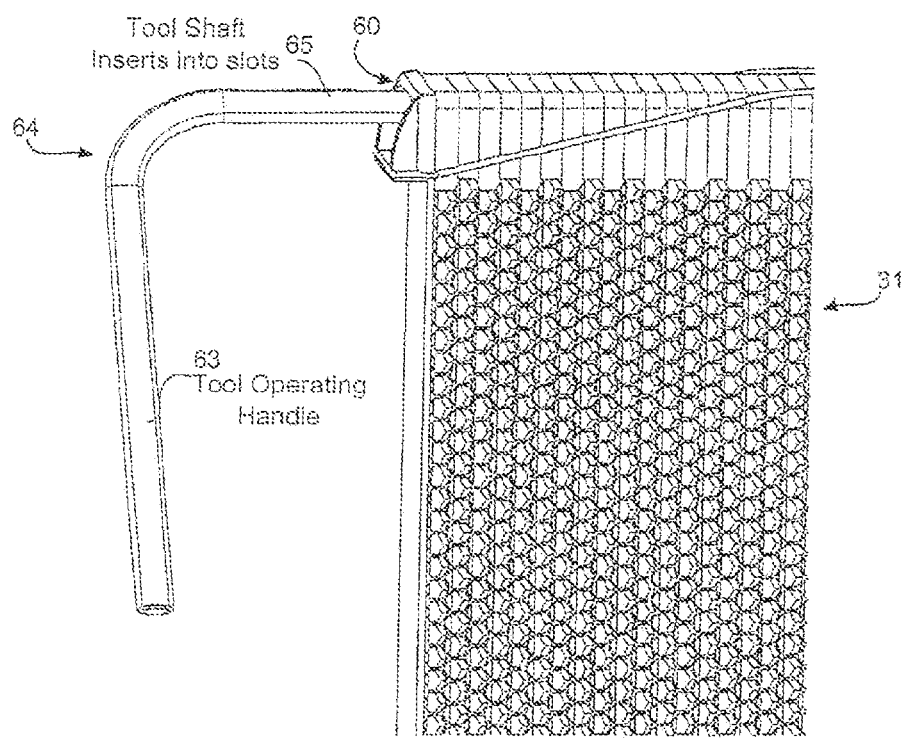
FIGS. 13*a* and 13*b* show the tool engaged in the first slot to lever the second honeycomb portions from the open to the closed position.
Figure 13B:
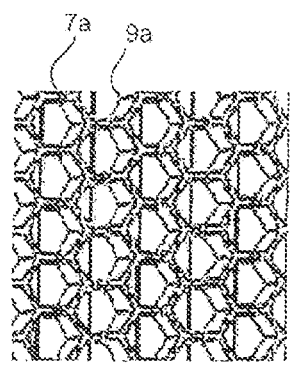
Figure 14A:
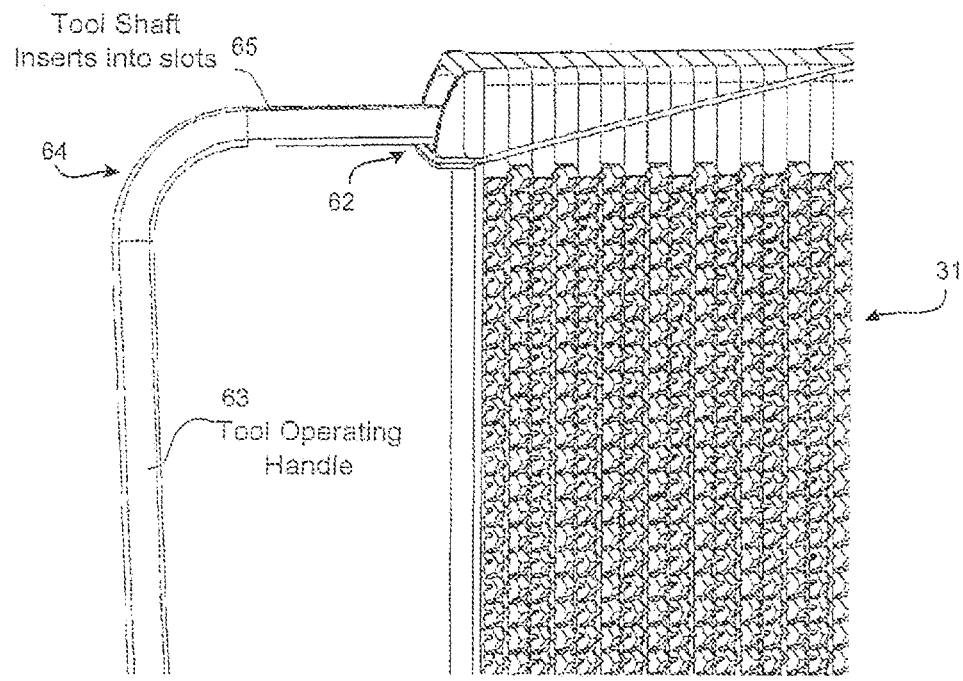
FIGS. 14*a* and 14*b* show the tool engaged in the second slot to lever the second comb portion from the closed position to the open position.
Figure 14B:
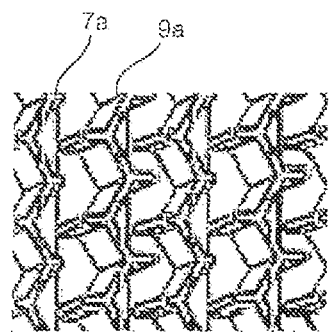

FIGS. 11a, 11b, 12a and 12b illustrate a tool 64 with a shaft 65 in the form of an oval bar or rounded rectangle (in profile as illustrated) that is long enough to span the honeycomb frame 31. It also has a handle 63 that allows a turning force to be applied. A non-limiting example of this is shown in FIGS. 11a and 11b. It is advantageous for the profile of the tool shaft 65 to be that of a rounded rectangle or at least to have some flat faces so that when it is turned it will lock into set positions. To move the second comb portions 9a into the cell open position the tool 64 is inserted into the second (lower) slot 62 at the top of the frame 31. The tool 64 is then turned 90 degrees. This provides a force between the moving and fixed comb parts 7a, 9a and lifts the moving part 9a upwards into the cell open position as shown in FIGS. 14a and 14b. To move the cells to the closed position the tool is inserted into the first (upper) slot 60 and the tool turned to provide the force necessary to move the parts into the cell closed position as shown in FIGS. 13a and 13b. The tool 64 may be of any suitable material including but not limited to metals, plastics, high density plastics, reinforced plastics, fiberglass, carbon fibre and the like.

Figure 15B:
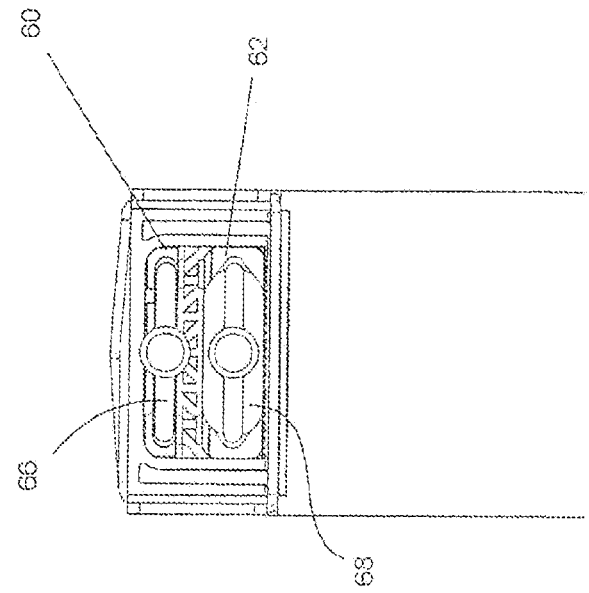
Figure 15A:
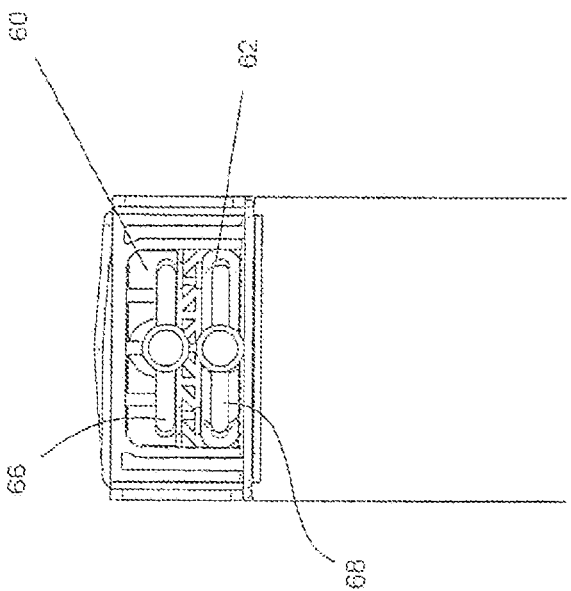

FIGS. 15a and 15b illustrate the use of a pair of elongate inflatable bladders 66, 68, which are disposed along slots 60, 62, respectively. As shown in FIGS. 16a and 16b, and FIGS. 17a and 17b, alternately inflating and deflating the bladders, increases or decreases the bladders height thereby pushing the second (movable) comb portions 9a, . . . , 9n up and down relative to the first (fixed) comb portions 7a, . . . , 7b.

Figure 17C:
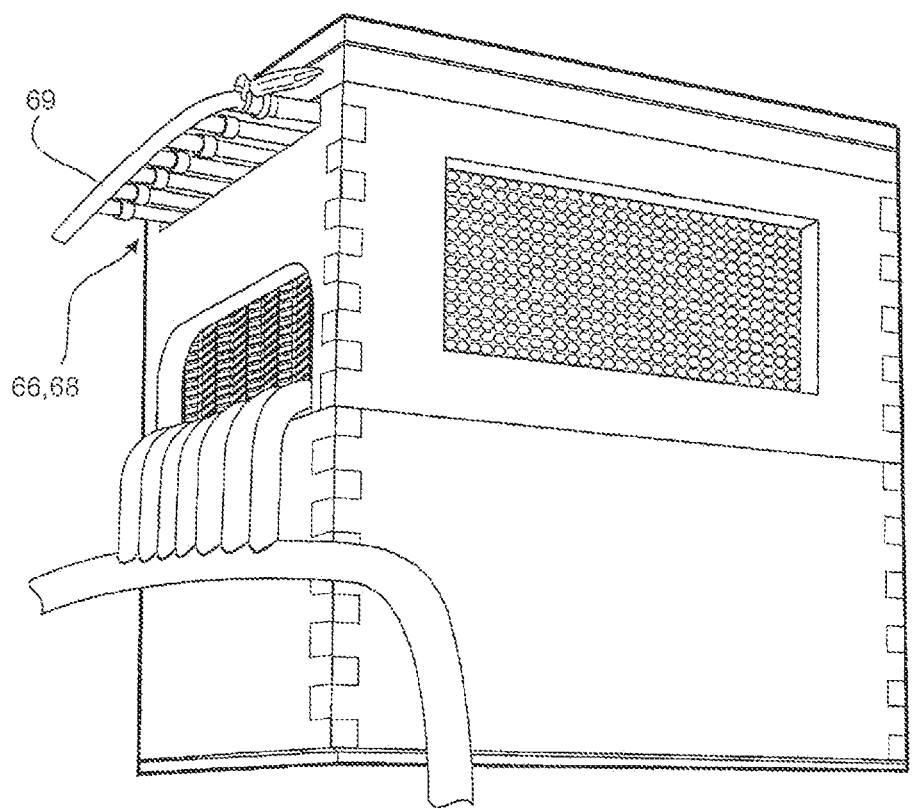
FIG. 17*c* illustrates a beehive with a pneumatic manifold for filling the elongate bladders shown in FIG. 17*a*.

FIG. 17c depicts a beehive according to an embodiment of the present invention including an array of frames each of which is operated via a plurality of tubes 66, 68 that are fed via a common pneumatic supply 69.

Figure 18:
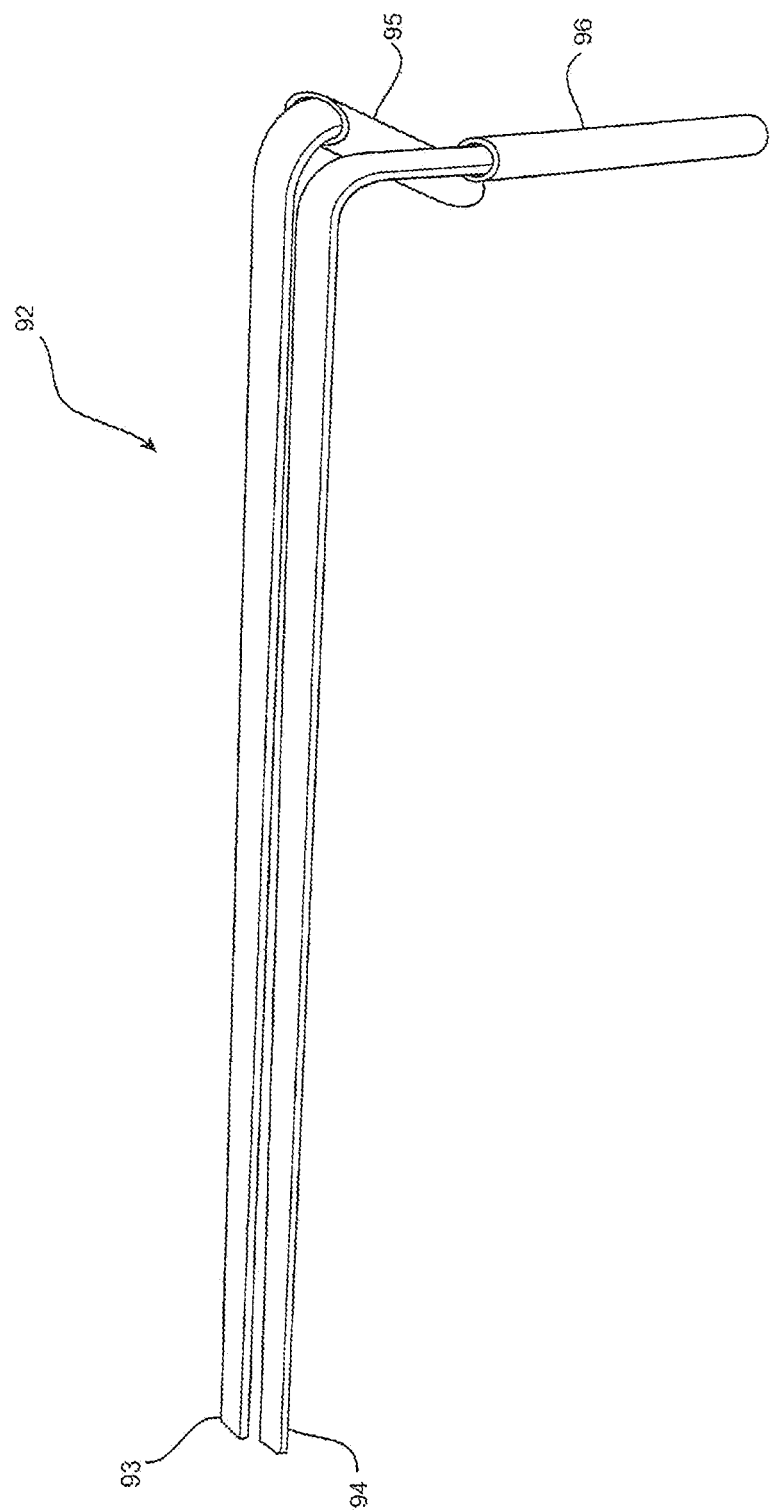
FIGS. 18 to 20 illustrate a squeeze tool (and its use) for moving the second honeycomb portions from the closed to the open position and vice versa.
Figure 19:
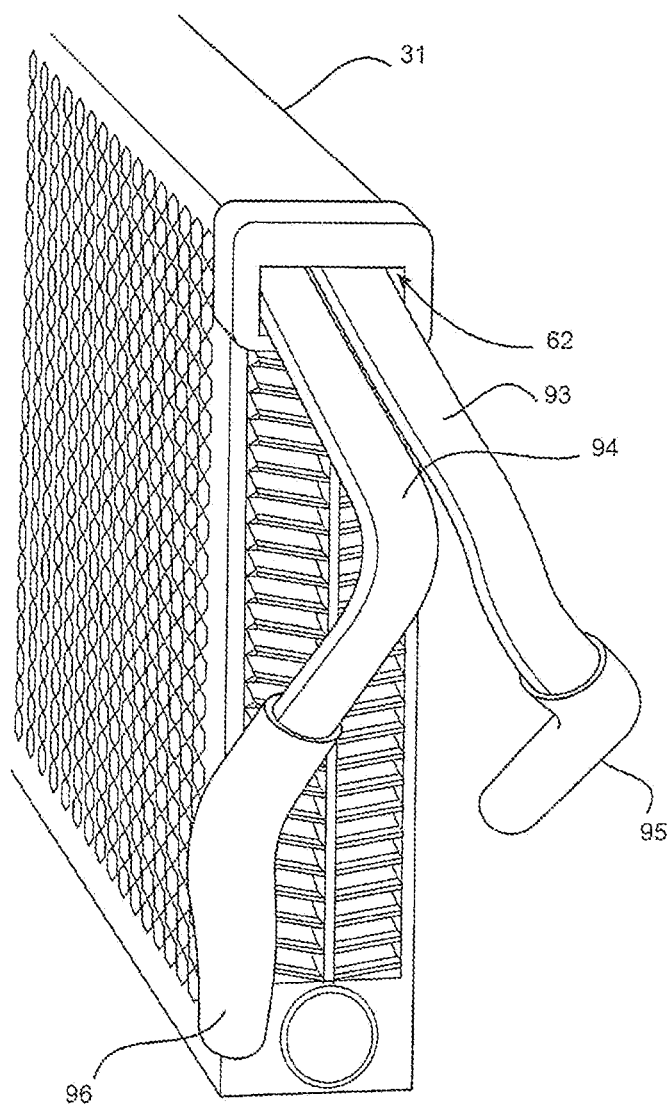
Figure 20:
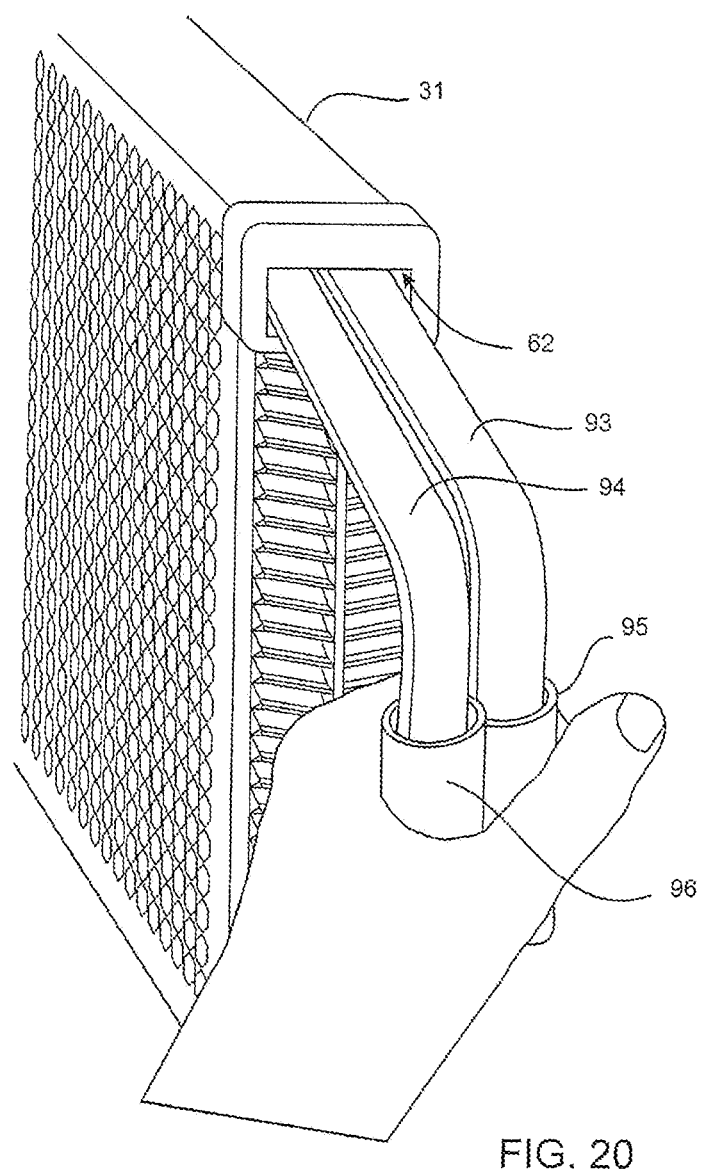

FIGS. 18 to 20 illustrate the use of a "squeeze" tool 92. The squeeze tool comprises two long, flat bars 93, 94 with bends at one end to provide handles 95, 96 (FIGS. 18, 19). These bars 93, 94 are inserted flat side horizontal, side by side into the second (lower) slot 62 at the top of honeycomb frame 31 (as shown in FIG. 19). In this position the two handles 95, 96 are horizontal and facing different directions. Grasping the handle of each bar 93 and 94, the operator twists each handle 95, 96 downward toward the other until his or her hand can encompass both handles. The handles thus grasped together are further squeezed until both handles 95, 96 are brought side-by-side as shown in FIG. 20. This applies action causes the bars 93, 94 to move from a diagonal to an upright orientation in which the exert pressure between the first and second comb portions 7a and 9a thereby displacing the second (movable) comb portions 9a to the cell opened position (see for example FIG. 17b). The process is repeated in the first (upper) slot 60 to move the comb to the cell closed position.

Figure 21:
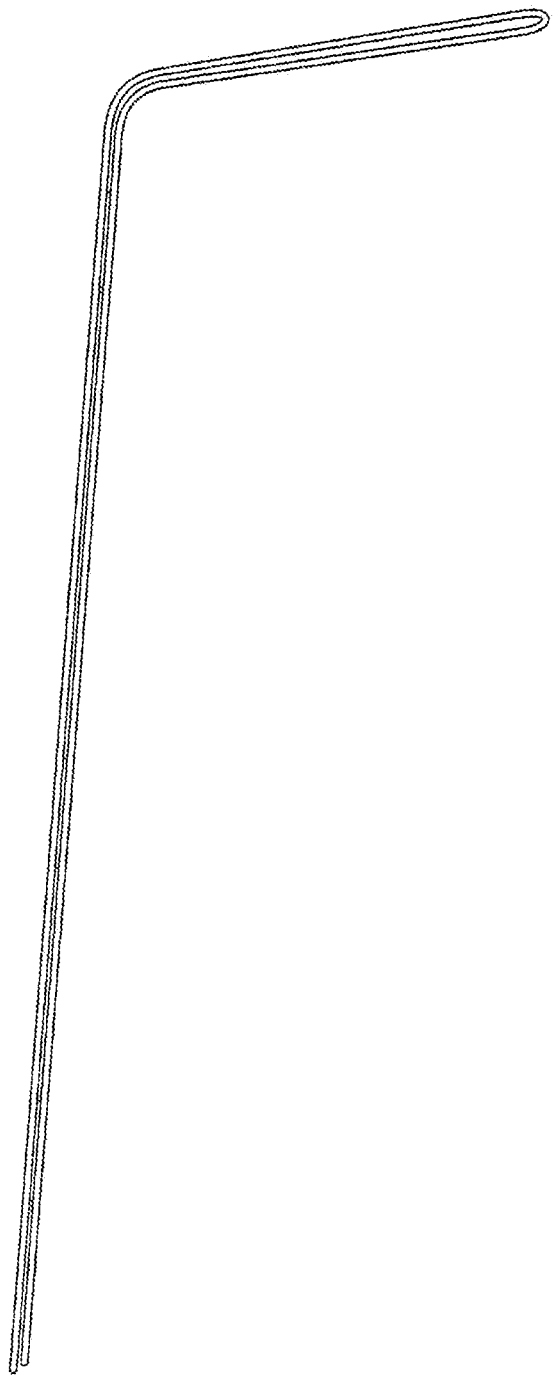
FIGS. 21 to 22 illustrate a twisting tool (and its use) for moving the second honeycomb portions from the closed to the open position and vice versa.
Figure 22:
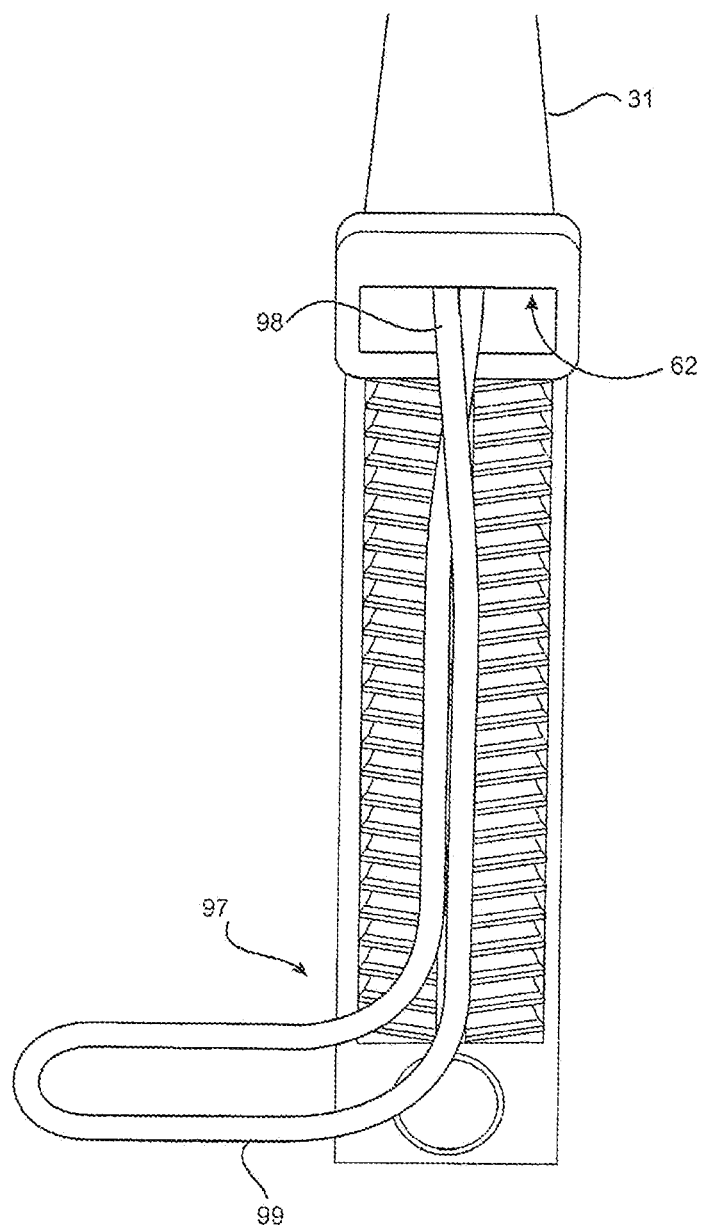
Figure 23:
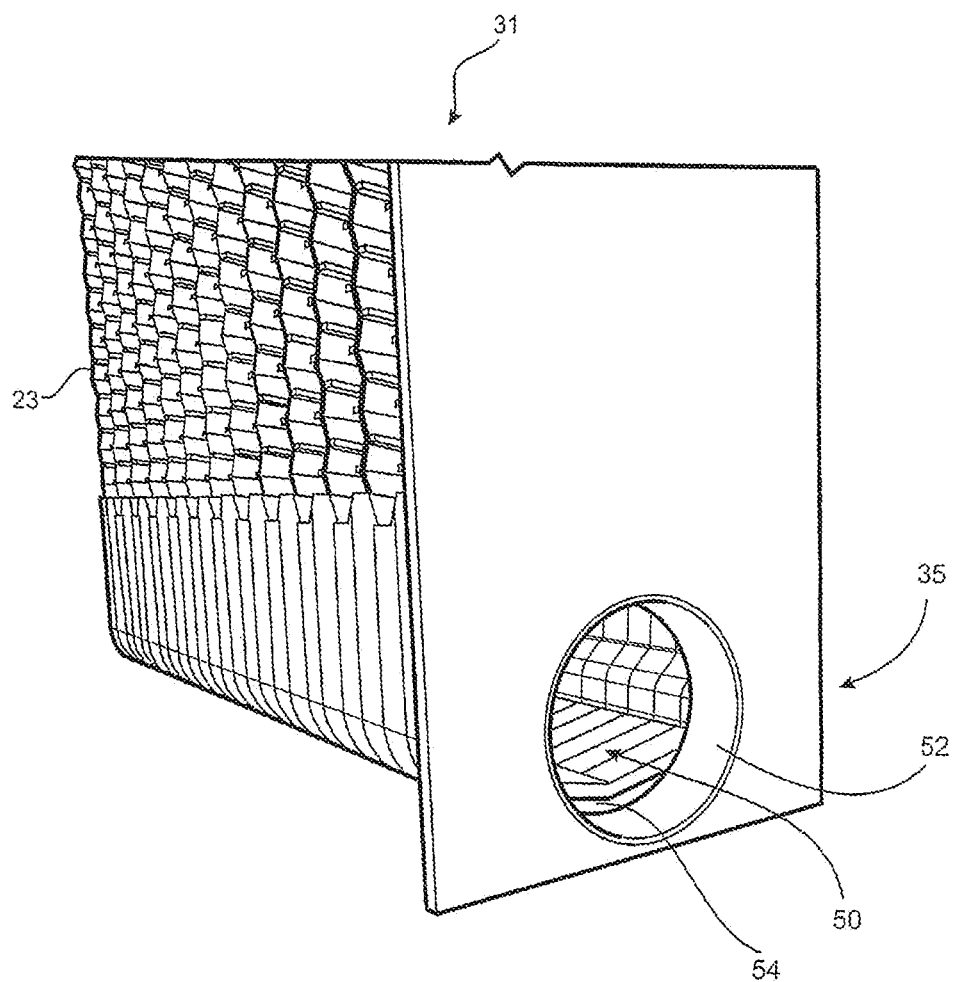
FIG. 23 illustrates a leak back slot of a trough of the honeycomb frame.
Figure 24:
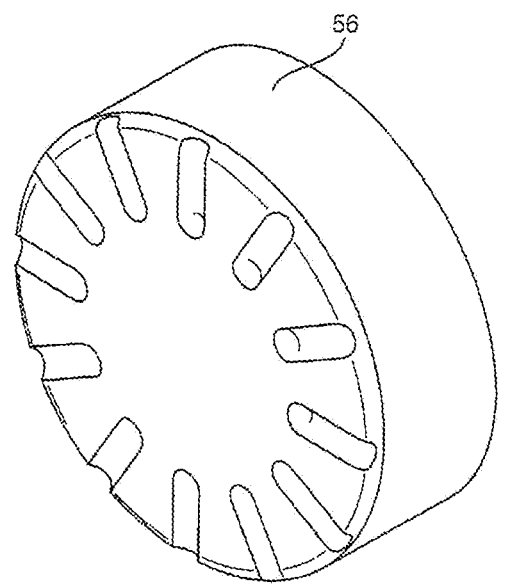
FIGS. 24 and 25 are perspective views of the drain plug for the outlet.
Figure 25:
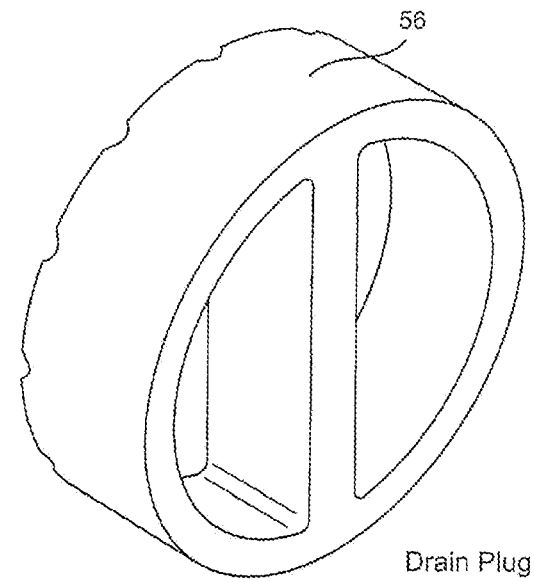
Figure 26:
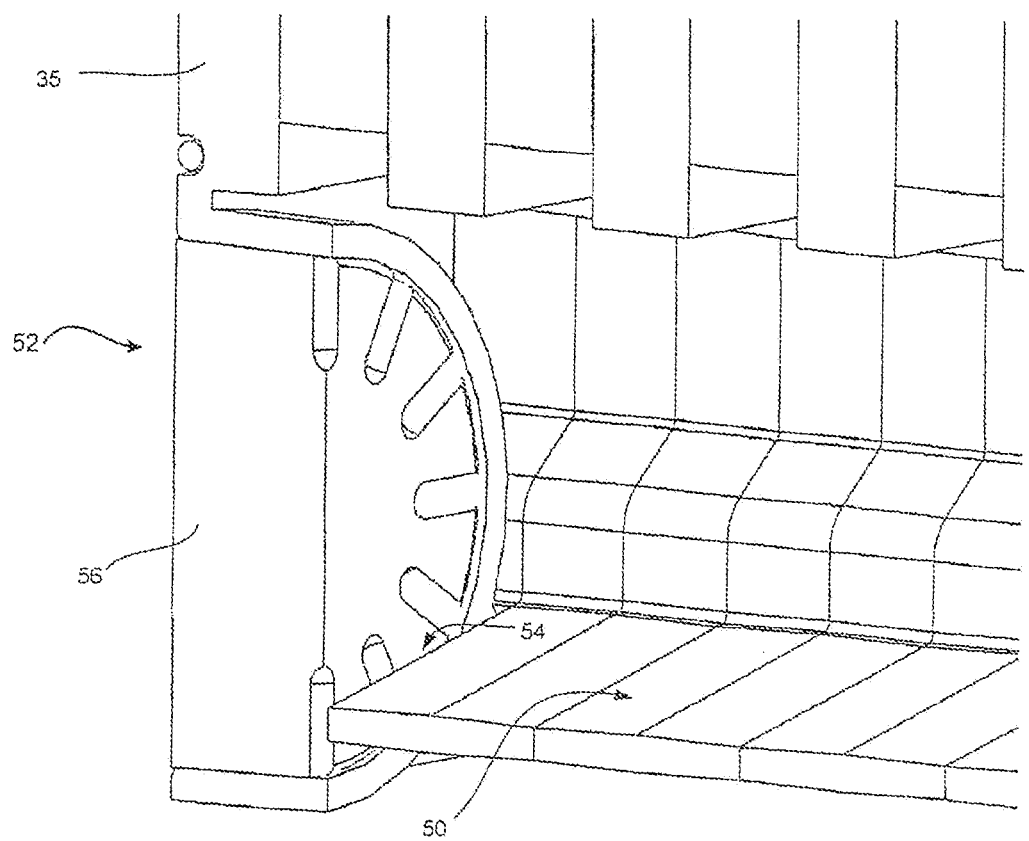
FIG. 26 is a partial, enlarged sectioned perspective of the drain plug closing the outlet and the adjacent leak back slot.
Figure 27:
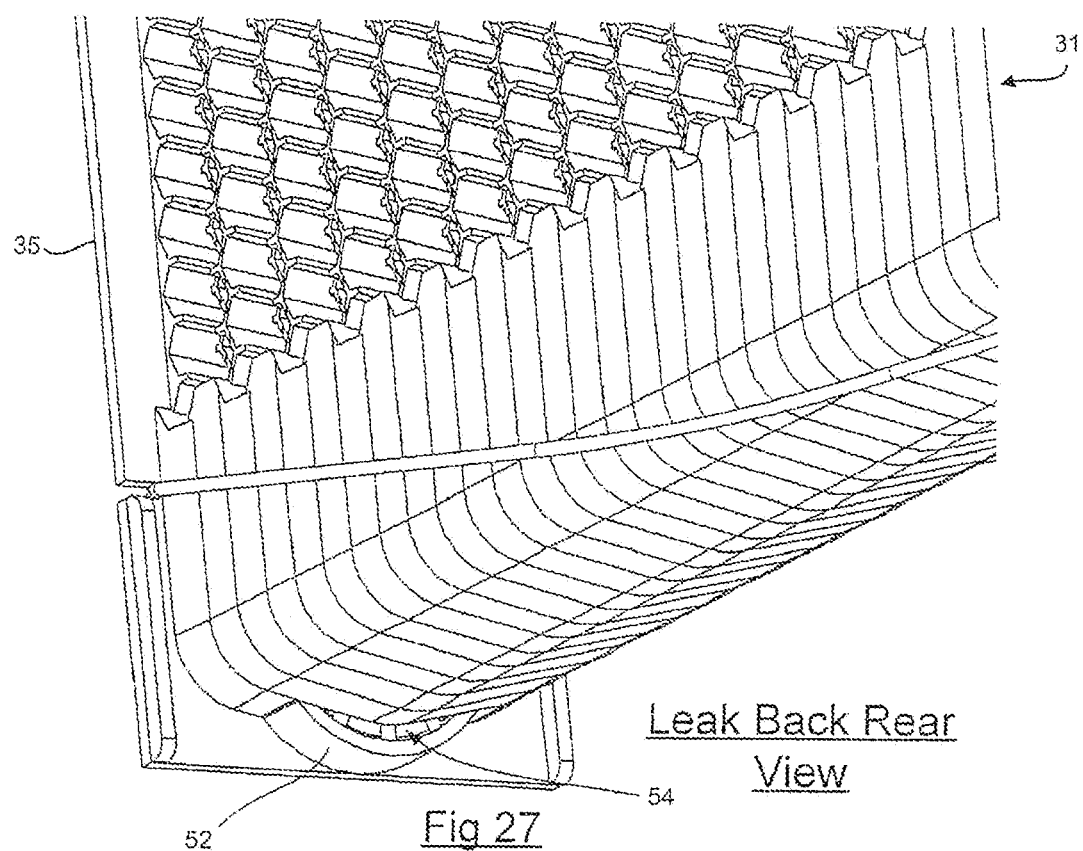
FIG. 27 is a partial, enlarged, rear perspective view of the frame depicted in FIG. 10*a* and FIG. 26 with the drain plug closing with the drain plug closing the outlet while providing a leak back slot.

FIGS. 21 and 22 depict a twisting tool 97 to move the second (movable) comb portions relative to the first (fixed) comb portions. The twisting tool 97 comprises a pair of parallel flexible elongate members 98, e.g., rods, that can be twisted over each other using handle 99, or at least through more than 90 degrees. As the tool members 98 are twisted over each other the effective height of the tool 97 increases thereby opening or closing the honeycomb. The second (movable) honeycomb portions are moved progressively as they come in contact with the twisted members 98. This has the advantage of decreasing the torque applied by the handle 99 as the force required to open the comb is spread over a longer turning movement. Therefore, the tool 97 requires less force to operate and makes it easier to turn by hand. The twisting tool 97 is inserted in its non-twisted state (as illustrated in FIG. 21). Then, once twisted by turning the handle 99 several times as shown in FIG. 22, it assumes the necessary height to apply force between the first and second comb portions to thereby displace the second (movable) comb portion relative to the first (fixed) comb portion. Another non limiting example of this can be achieved by using one fixed metal rod and one or more flexible metal cable/s. Once the pair are inserted and turned the cable/s winds around the metal rod providing the necessary force to displace the moving parts. Any suitable material may be used in substitution for the metal cable or rod including but not limited to, plastics, high density plastics, reinforced plastics, fiberglass, carbon fiber and the like.

Briefly referring back to FIG. 3, each of the first (fixed) comb portions (7a, 7b, etc) have a foot (10a, 10b, etc) at their respective lower ends. Referring now to FIGS. 23 to 27, the honeycomb 23, collectively formed by the honeycomb assemblies, has a trough 50 extending along the lower edge, formed by a concatenation of the feet 10a, 10b etc. The trough 50 collects honey draining from the honeycomb 23 once the cells are in an open position. The frame 31 is oriented in the hive so that the trough 50 drains to the outlet 52. An opening, or gap 54 is formed through the bottom of the trough 50 adjacent the outlet 54. A plug 56 (shown in FIGS. 24 and 25) is inserted in the outlet 52 so that residual honey in the trough 50 leaks through the opening 54 for consumption by the bees. This is sometime called a 'leakback' slot.

In use the frame is arranged for the trough to angle downward to an outlet 52 formed through frame end 35. An opening, or gap, 54 is formed through the bottom of the trough adjacent the outlet. Upon the outlet receiving a stopper, such as a plug 56 (shown in FIGS. 24 and 25), residual honey in the trough slowly leaks through the opening 54 for consumption by bees.

Narrow-Bladed, Bee-Benign Artificial Honeycomb

Figure 28:
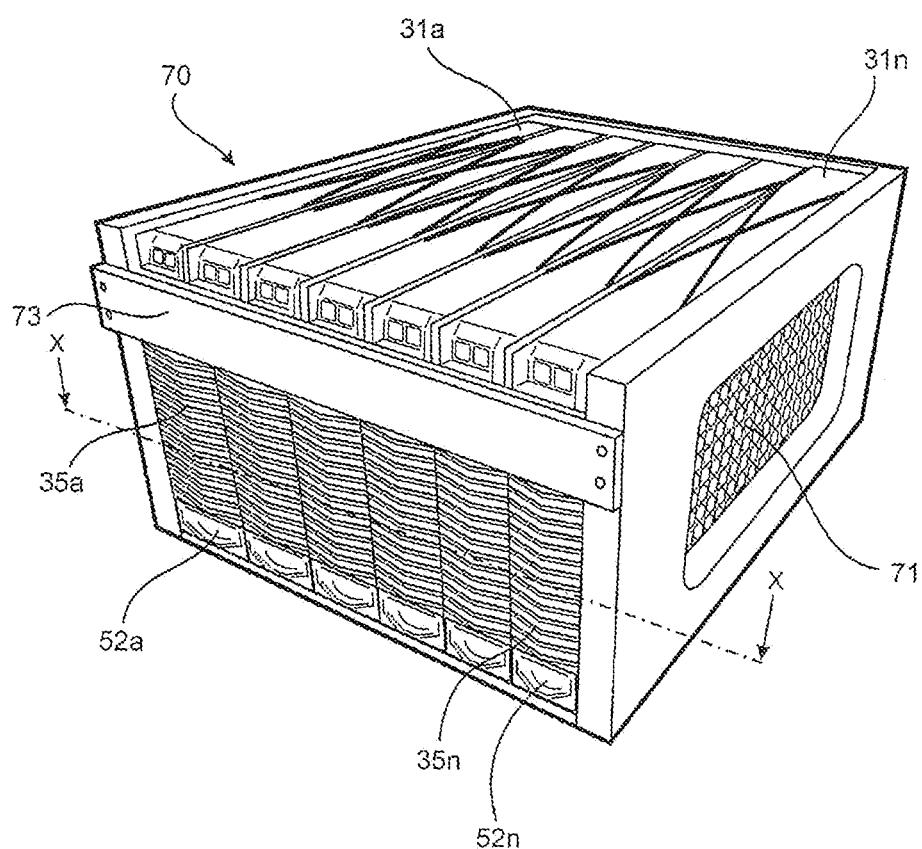
FIGS. 28 to 35 show beehive boxes and hives according to preferred embodiments of the present invention.

Referring now to FIG. 28, there is shown a beehive box 70 or as it is sometimes called a "honey super" which houses an array of honey frames 31a, to 31n. These frames may be of the same construction as honey frame 31 of FIG. 10a but may equally be of a much narrower or thinner construction formed by a concatenation of significantly narrower 'blades' or splittable comb portions. The beehive box 70 is dimensioned to snugly receive the array of honey frames so that when the frames are all inserted there are no spaces for pests such as hive beetles to hide from the bees. Thus, problems with pests are minimized and there are no spaces for brace or bur comb to be built. Brace and bur comb is extra comb that bees make in 'open' areas of a hive. These small intrusions of comb makes opening a hive for inspection more difficult and messy. The snug dimensioning of the box relative to the array of frames 31a to 31n assists in making the overall combination of the box and the frames robust, which is advantageous for trouble-free transportation.

In an embodiment of the invention particularly illustrated in FIGS. 37 to 43, there is provided frames 100a-h for a honey super 101, each frame comprising a plurality (about 36) of first comb portions 102 and a plurality (also about 36) of second comb portions 103 which can move relative to each other between a closed cell forming position (see FIG.

6) and an open cell draining position (see FIG. 7), the first and second portions together a foundation for the cells comprising the rear wall of a cell but less than the full length of the cells.

Figures 42A, 42B, 42C:
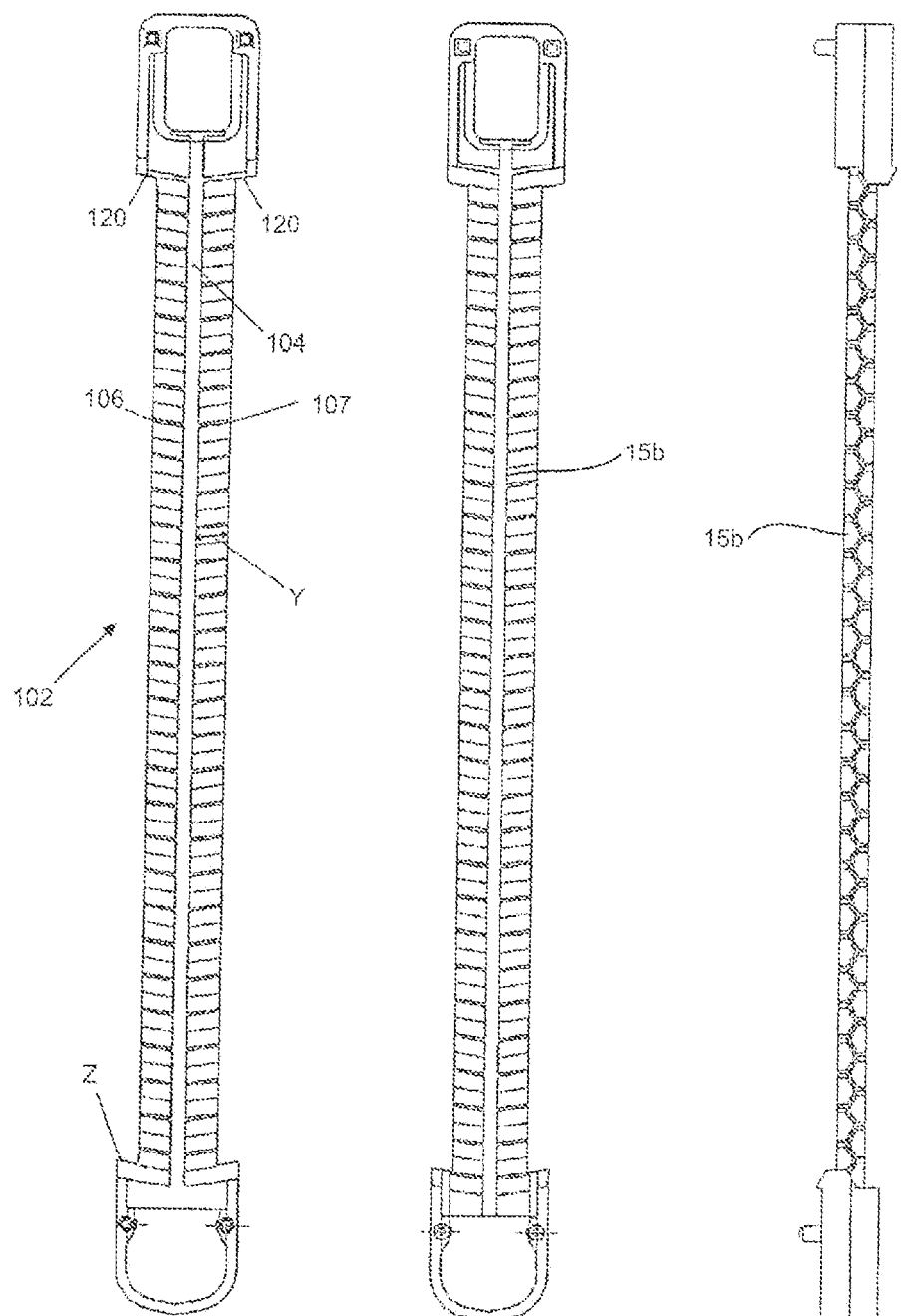
FIGS. 42*a, b, c* and 43*a, b, c* are back, front and side elevations of the reduced length flow combs (first and second comb portions) according to the present invention.
Figure 43A:
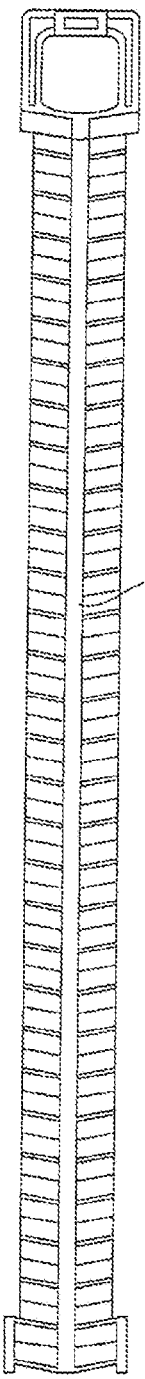
Figure 43B:
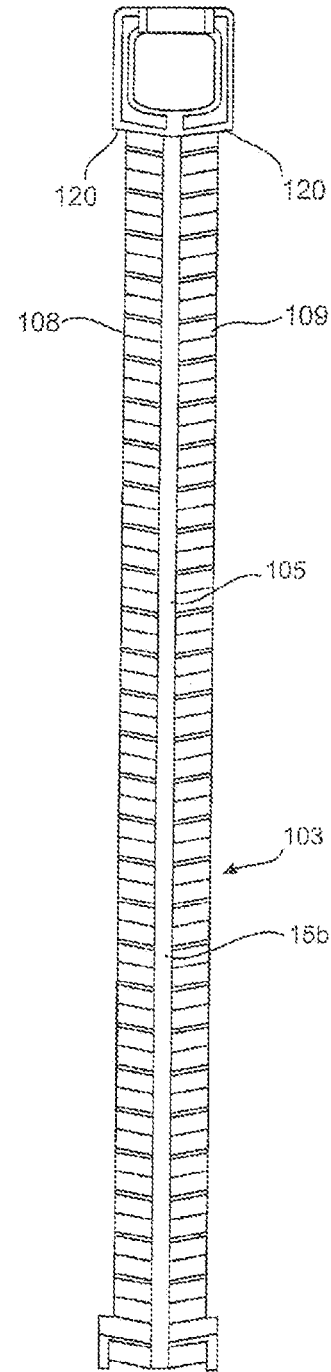
Figure 43C:
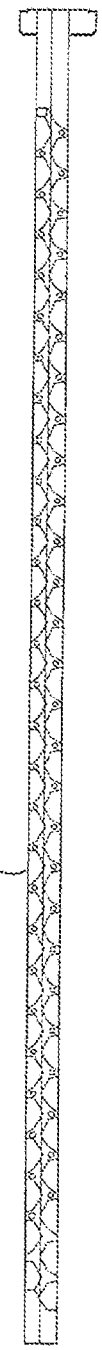

Referring to FIGS. 42 and 43, the first portion 102 and the separate second portion 103 each have a central spine 104, 105 having a thickness of about 2.5 mm, say 2 mm to 3 mm. Extending outwardly from the spine are reduced length cell side wall portions 106, 107 and 108,109. As described previously, the side wall portion of each portion is about ½ of the hexagonal shape of a cell and each spine 104,105 has a profile to form about ½ of the cell rear wall 15b (see FIG. 6) such that when the portions come together a complete hexagonal end wall 15b is formed.

Each cell side wall portion is of reduced length by which is meant that the side wall does not define the full length of the cell wall (that is, from the rear wall to the front open mouth of the cell). A full length cell wall is typically between 15-25 mm and the length of the cell walls (see "Y" is FIGS. 6 and 42) of the first and second portions is less than about ½ and is about 6 mm, say 5 mm to 7 mm.

In FIG. 42, "Z" illustrates a typical full length cell.

The reduced length flow combs form a foundation for bees to continue to extend the cell wall using wax to the full length prior to depositing honey into the cell 15a. Thus, when all the cells in the frame are fully formed, the comb will be a combination of "rear" artificial comb and "front" softer natural comb.

Figure 38:
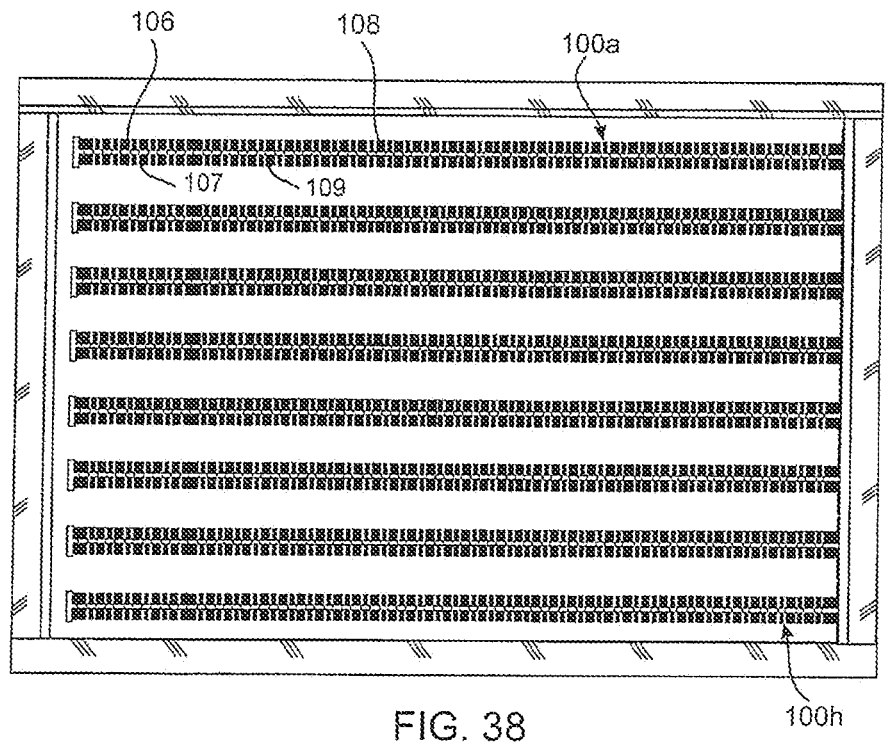
FIG. 38 illustrates a plan section view of FIG. 6 better illustrating the reduced length flow combs.
Figure 39:
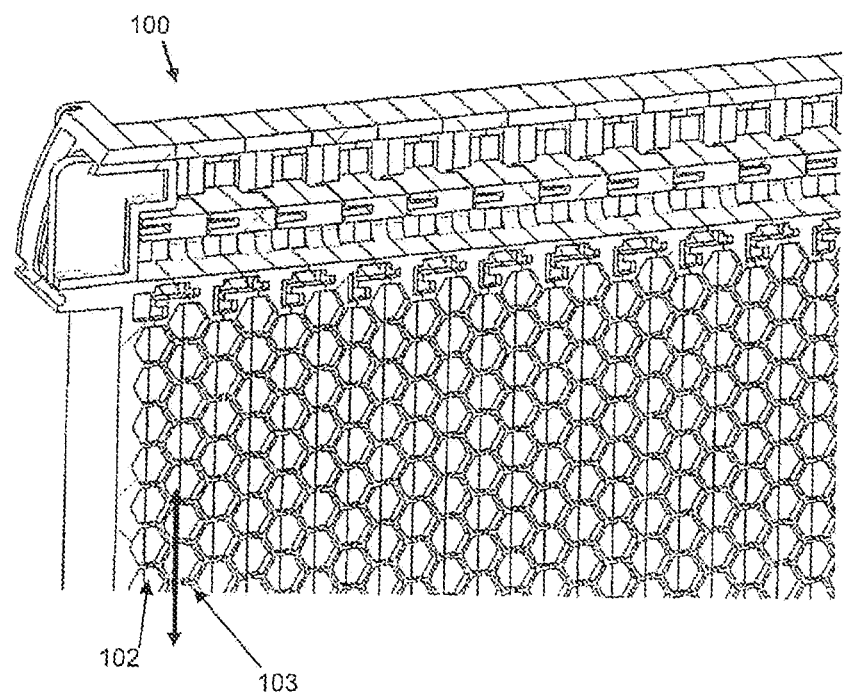
FIG. 39 is a partial perspective view of a frame and the cell foundations provided by the reduced length flow combs.

FIG. 38 illustrates a plan view into an open super with the heads 8,18 of each comb portion removed to better illustrate that the oppositely extending side walls 106,107 of the first portion 102 and the side walls 108,109 of the second portion 103 are not full length (that is do not extend to adjacent the outer edge area 120 (see FIG. 42) of each portion 102, 103. Bees will continue to build the cell walls to the full length using natural comb material.

Figure 40:
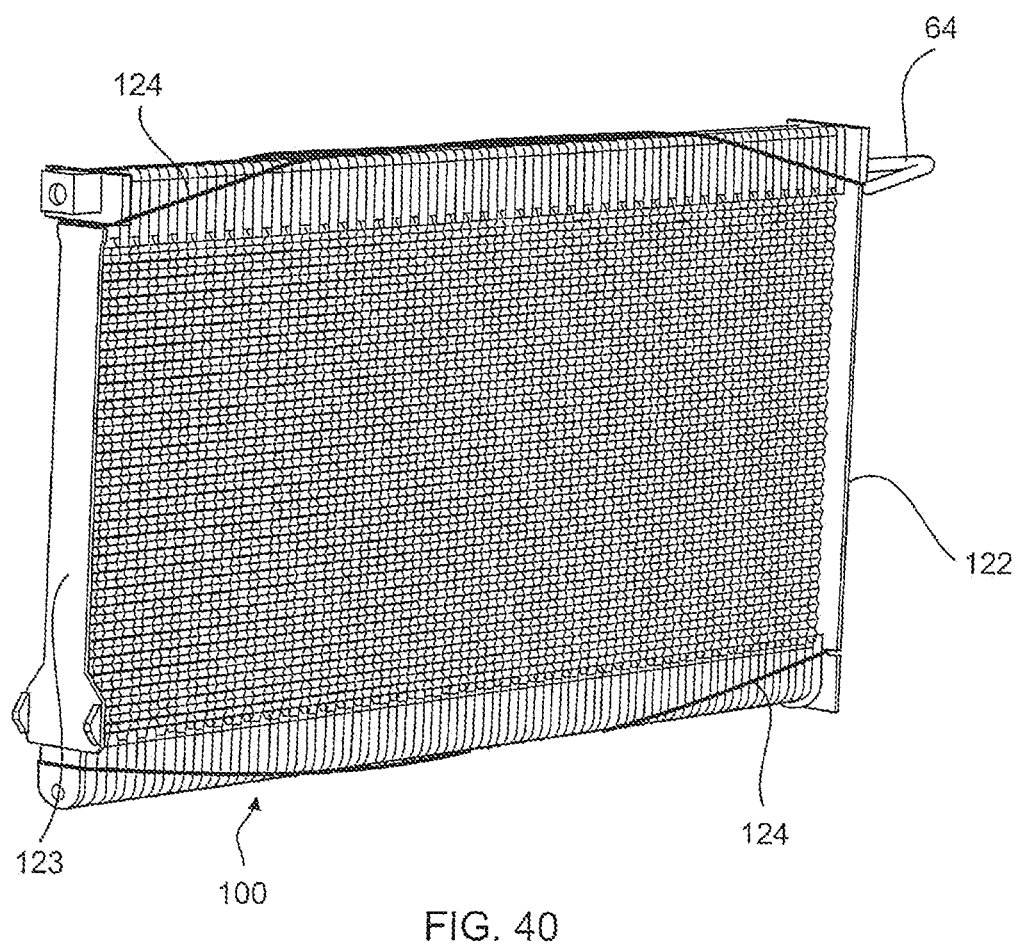
FIG. 40 illustrates a full complete frame having the reduced length flow combs.
Figure 41:
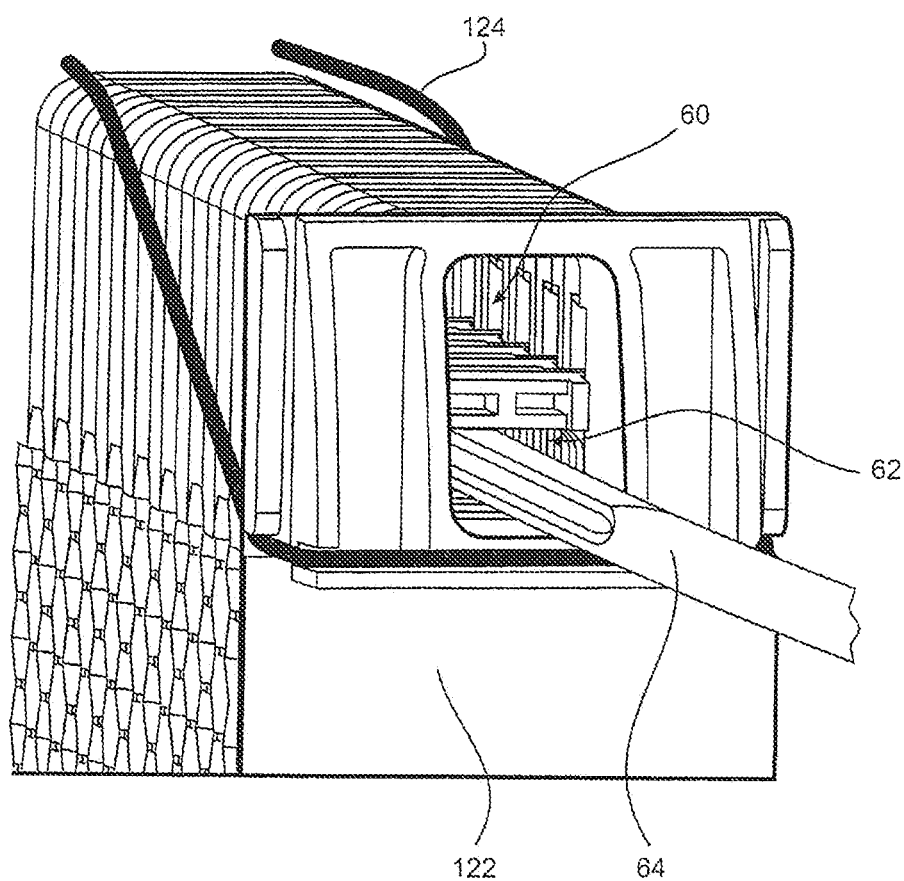
FIG. 41 illustrates an upper part of a frame and illustrating operation of the second honeycomb portions by a tool to open and close the cells in the frame.

FIG. 40 illustrates a single frame 100. The frame includes end support plates 122 and 123 with the repeating arrays of the reduced length comb foundation plates as described above positioned between the plates. Ties 124 are tensioned to hold the frame together with enough force that it does not sag in the middle under its own weight when full of honey.

Figure 44:
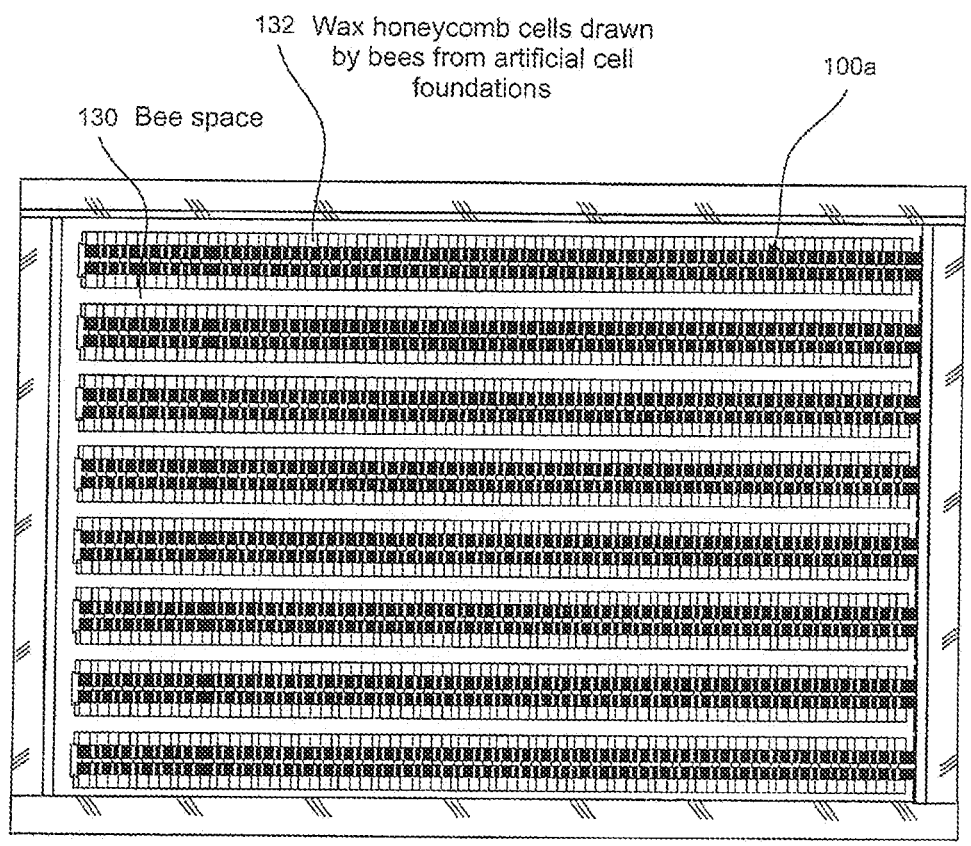
FIG. 44 illustrates a plan section view of similar to FIG. 38 subsequent to the bees drawing out wax honeycomb cells from the cell foundations.

Referring now to FIG. 44, in use bees build wax comb 132 naturally in a hive leaving space between adjacent comb surfaces of about 9 mm, although it does vary. This space they naturally leave is called the bee space 130.

The space between the artificial comb in the prior art is about 13 mm. This leaves the bees building approximately 2 mm of natural wax comb 132 beyond the artificial comb 100a to bring the adjacent comb surfaces to the natural bee space 130 of 9 mm.

The cut down shallower depth cell artificial comb according to a preferred embodiment of the invention that is shown in FIG. 44 has around 32 mm between combs leaving about 11.5 mm of natural wax comb 132 that the bees build to each adjacent comb surface. Thus, the ratio of natural comb to plastic in the hive is higher. And the amount of movement a bee would experience if down a cell would be less. Therefore, embodiments of the present invention are less disturbing to the bees.

Beehive Box with Viewing Spaces for Visual Inspection

The beehive box 70 is formed with cutouts 71 in its side walls and the back of the box is formed without a back wall but instead with a horizontal rail 73 for structural integrity of the box. Consequently, it is possible for a beekeeper to inspect the sides of the outermost frames 31n and 31a. It is also possible for the beekeeper to visually inspect the end plates 35a to 35n of each of the frames. Furthermore, the end members 35a to 35n are preferably made of clear plastic so that the beekeeper can look through them and see the activity of at least some of the bees within each of the frames 31a to 31n.

Figure 29:
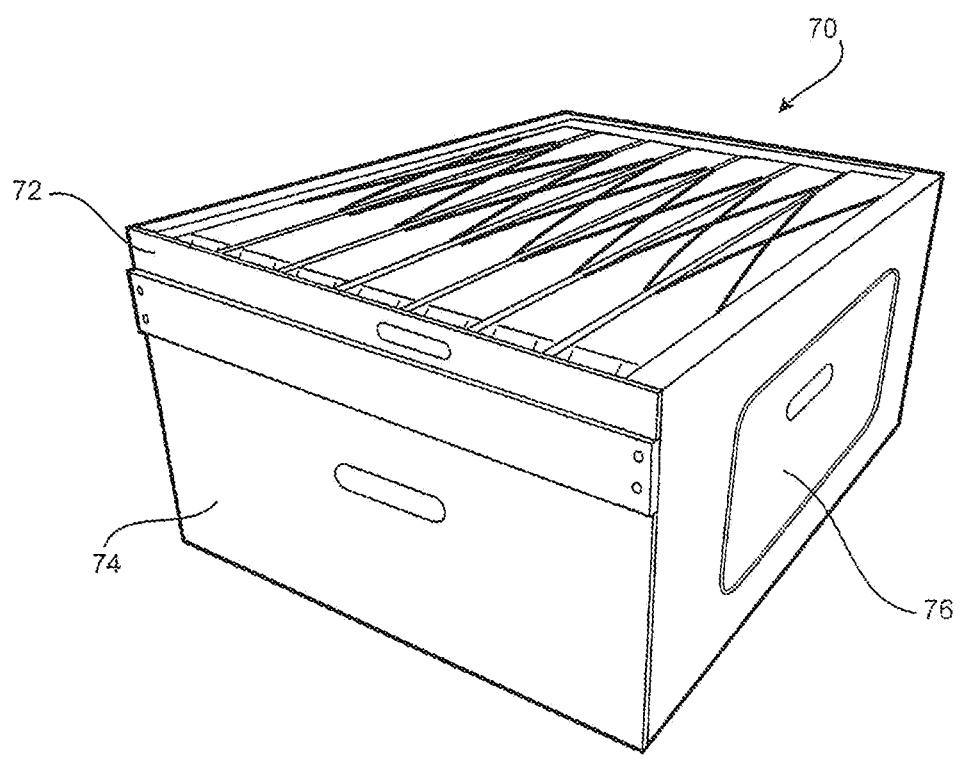

FIG. 29 shows the usual configuration of the beehive box 72 wherein panels 72, 74 and 76 have been located on the back and sides of the box to protect the frames and bees within. The panels are retained in place by clips or any other suitable means.

With the panels removed, as shown in FIG. 28 the beekeeper has ready access to the outlets, for connection of tubes, and to the slots of the honeycomb assemblies for insertion of a tool to open or close the honeycomb assemblies. Furthermore, honey harvesting pipes and any other pipes, harvesting manifolds, wires or comb splitting tools can be connected directly to the frames since their ends are very accessible whilst panels 72 and 74 are removed.

Figure 30:
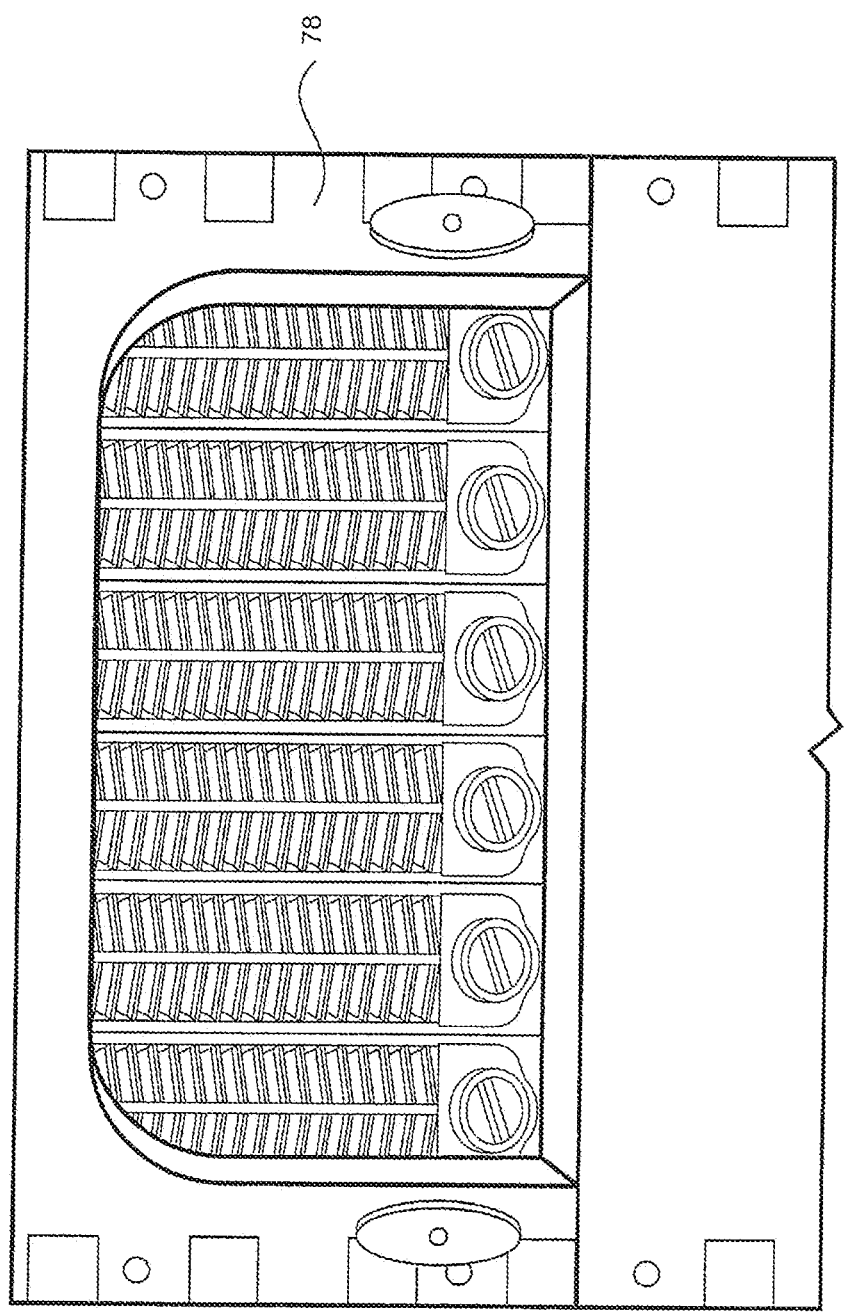
Figure 31:
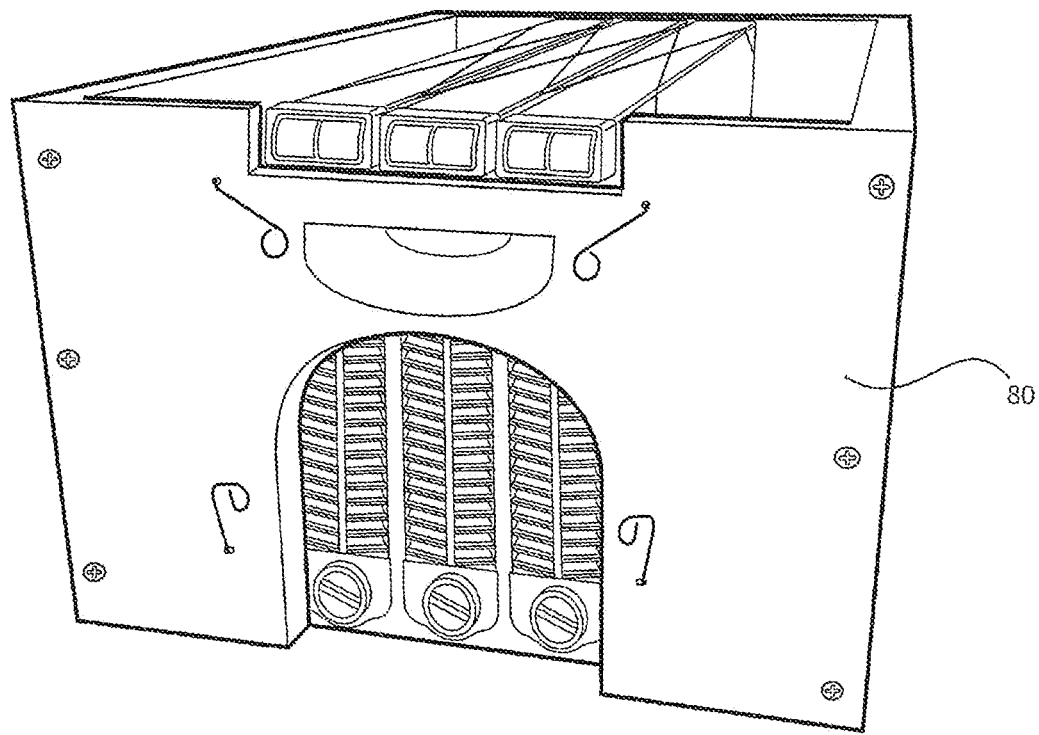
Figure 32:
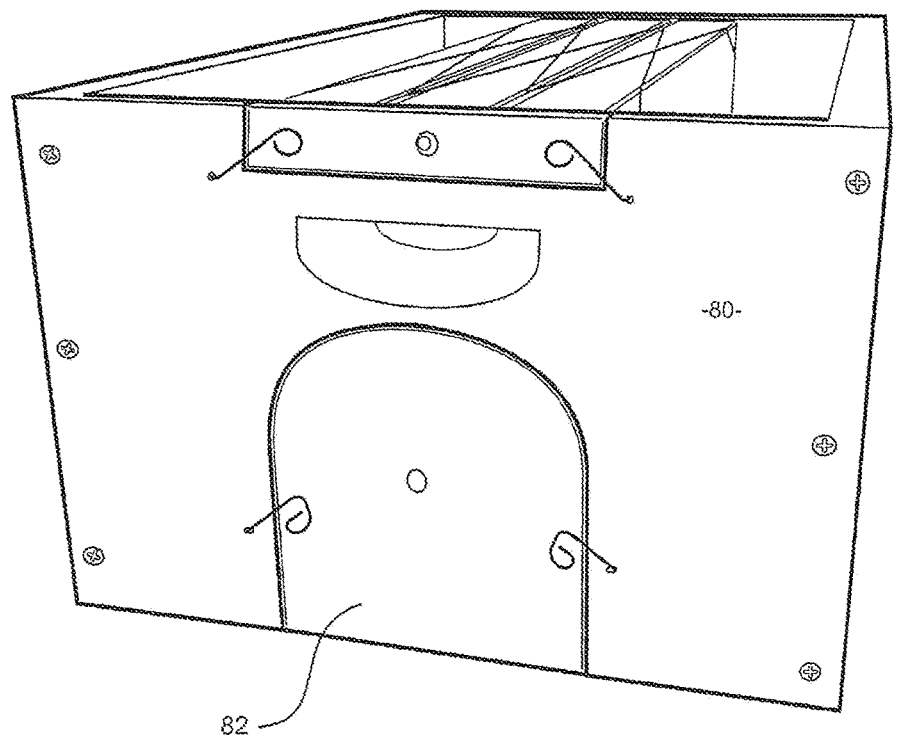

Referring now to FIG. 30, there is shown the back of another similar box 78 according to a further embodiment of the invention with panel removed. Similarly, FIGS. 31 and 32 show another beehive box 80 according to a further embodiment of the invention with panel removed (FIG. 31) and with panel 82 in place (FIG. 32).

Figure 33:
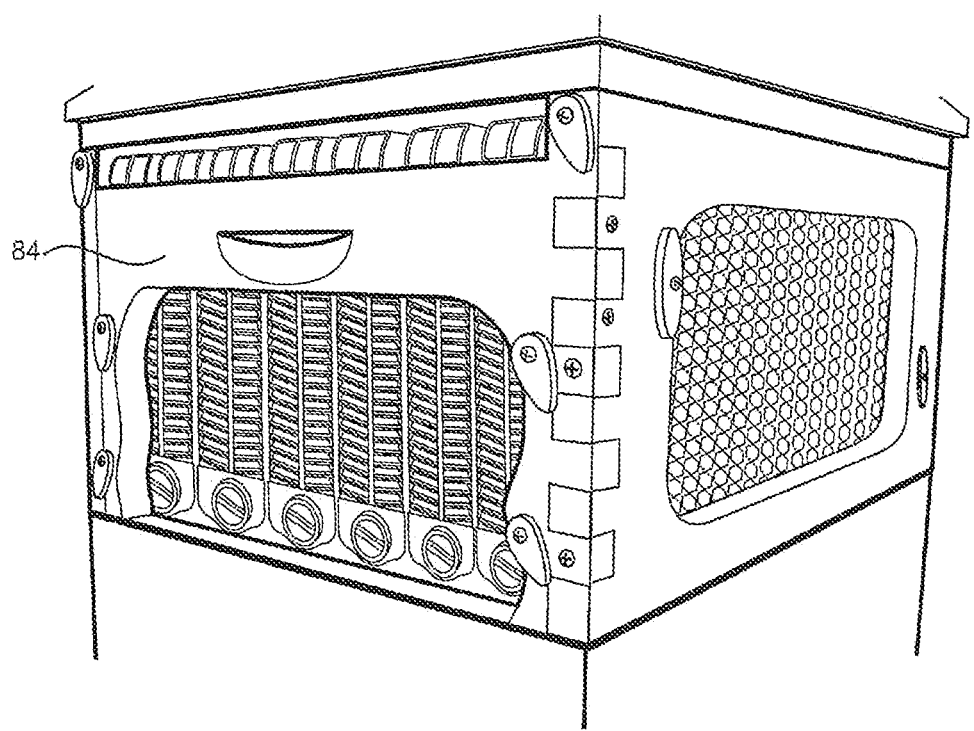
Figure 34:
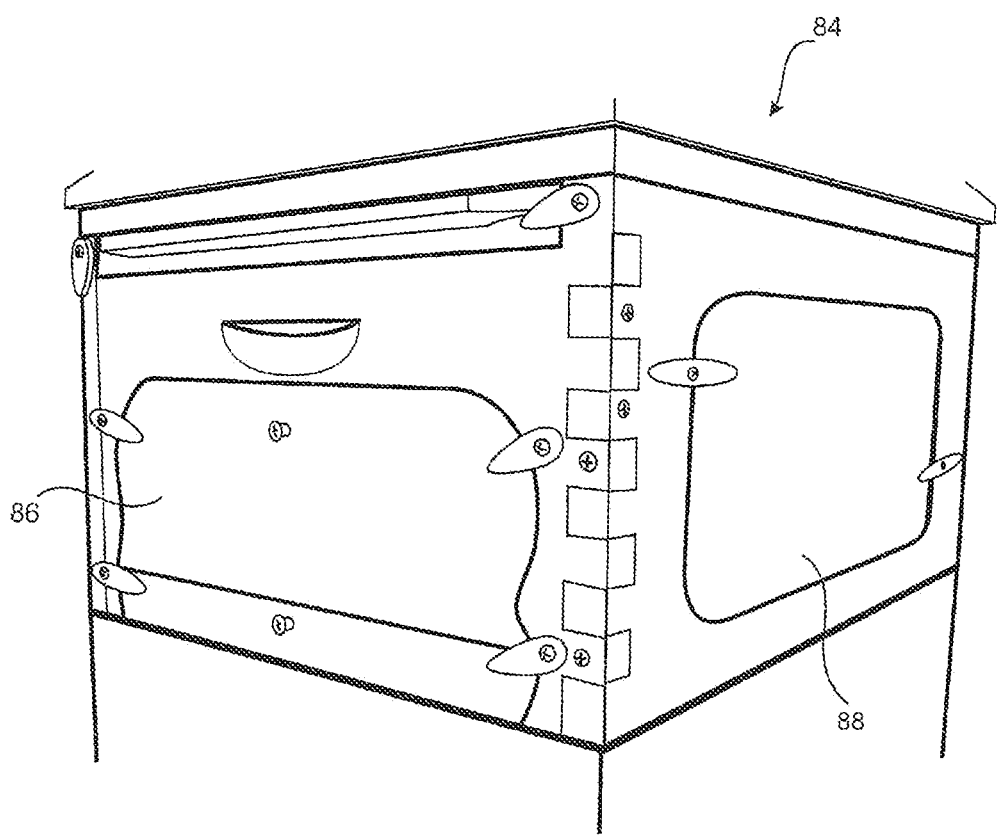

A further beehive box 84 is shown in FIG. 33 with back and side panels removed and with the back and side panels 86, 88 in place in FIG. 34.

Figure 35:
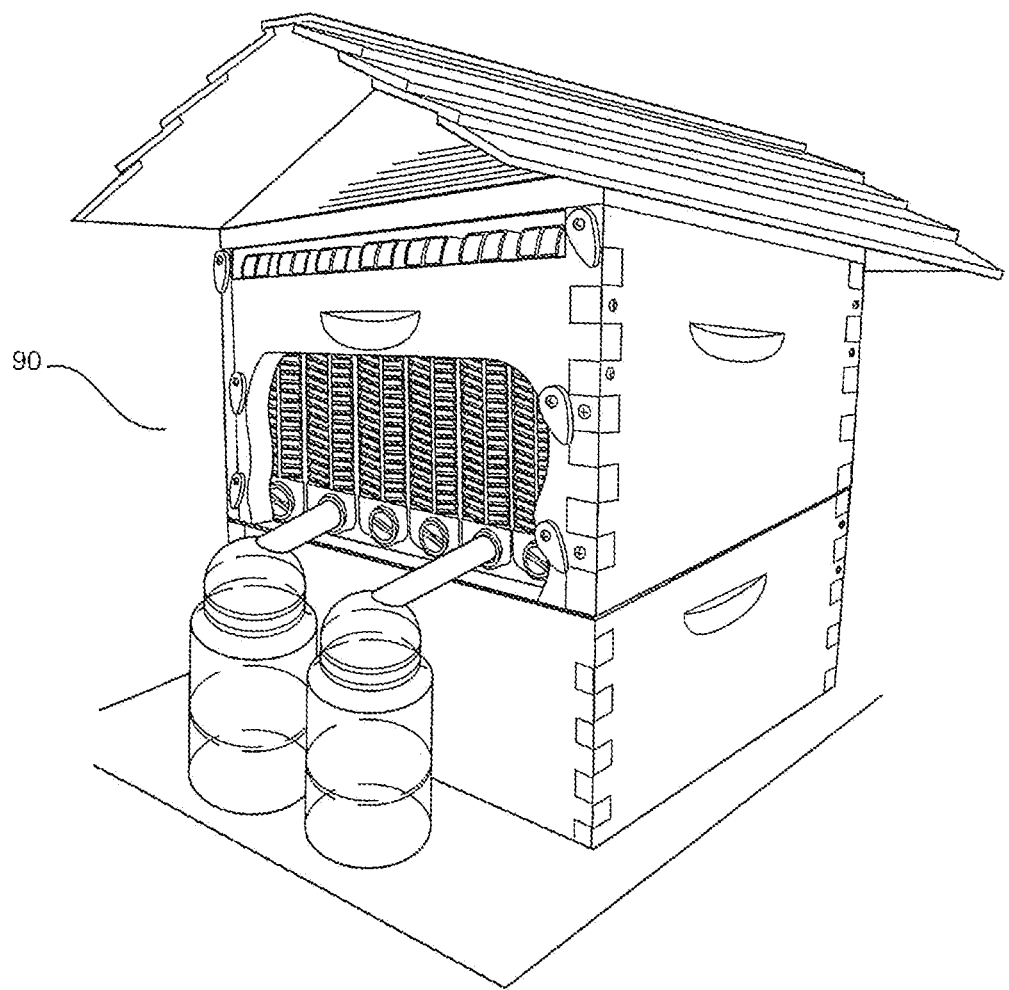
Figure 36:
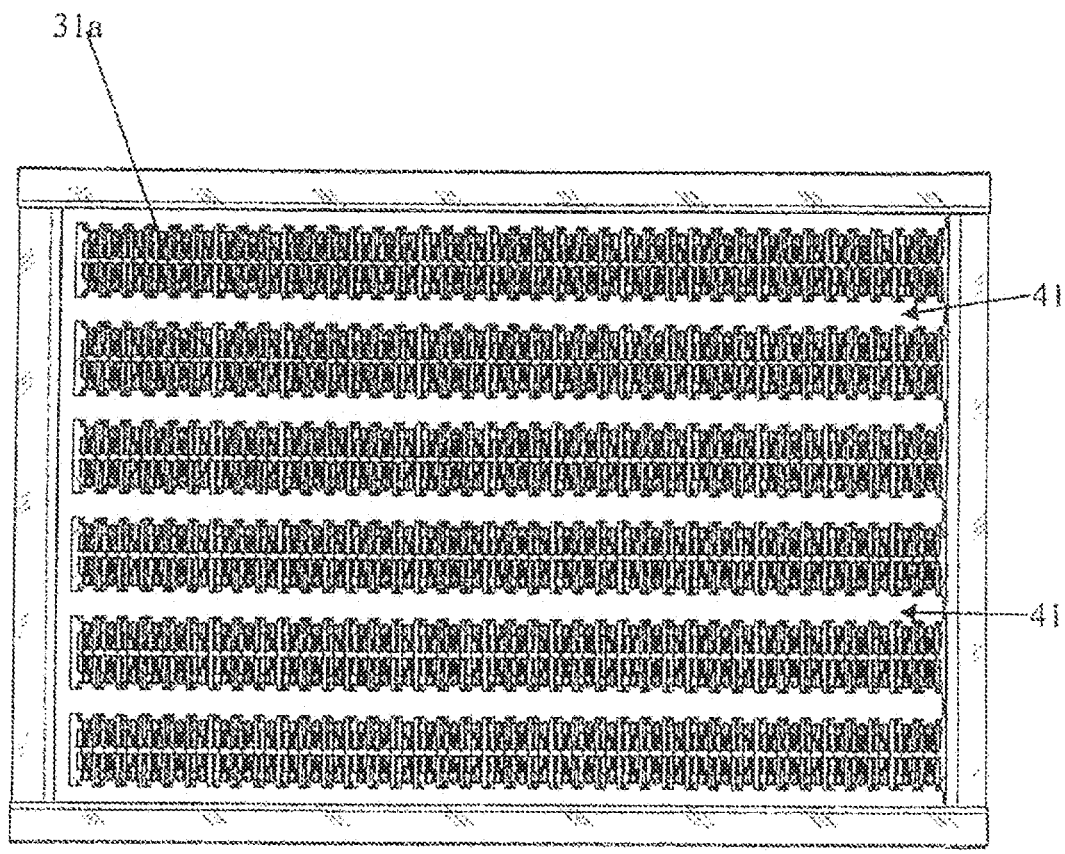
FIG. 36 illustrates a plan view through section X-X of FIG. 28 and illustrating the full size frames and the small vertical gaps between frames which are used by bees to access the cells.
Figure 37:
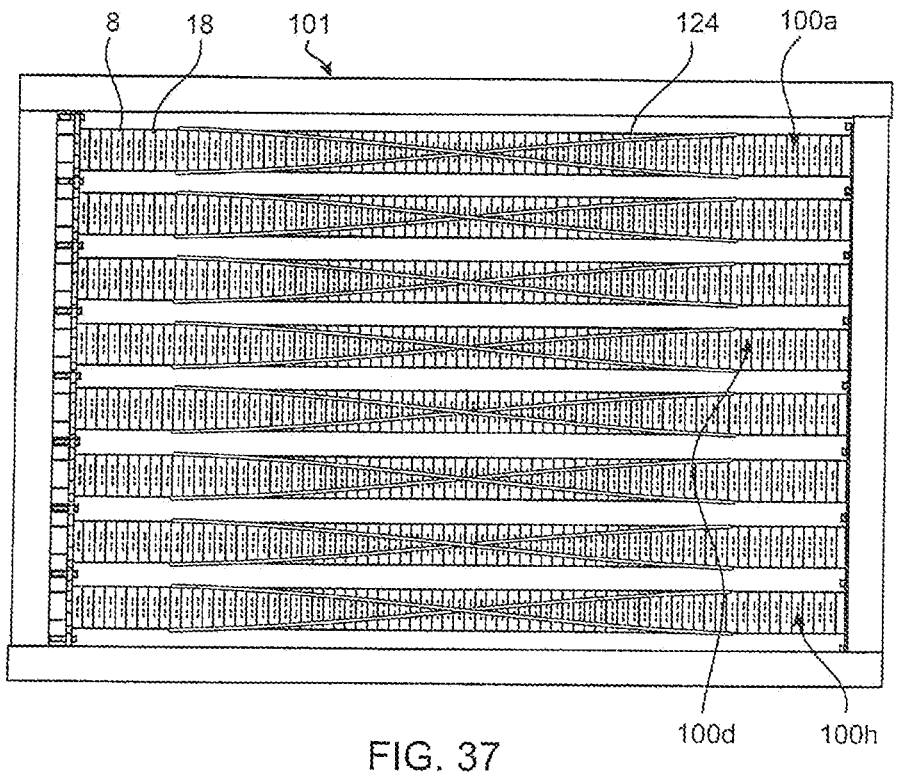
FIG. 37 illustrates a plan view of an open honey super illustrating 8 frames having reduced length flow combs providing cell foundations to be drawn out to full length by the bees.

FIG. 35 shows a beehive according to an embodiment of the present invention including a beehive box 90 with inspection panel removed. Tubes have been attached to the outlets at the end of each frame within the box and the cells of the honeycomb assemblies of each hive have been split by moving the movable, second honeycomb portions relative to the fixed, first, honey comb portions. That movement may be achieved in any of the previously described ways, e.g., pneumatically or by using any of the previously described mechanical tools. It could also be achieved by using a remotely controlled actuator if desired.

Hotwire Method for Honey Extraction

The honeycomb frames may have electrical conductors such as embedded wires or similar to melt wax portions of the honeycomb to form drainage conduits to extract the honey under gravity.

Collection of honey can be very laborious and time consuming. As an example, a common way to collect honey requires the following steps to be carried out: A bee-proof suit needs to be donned; the lid of the hive is opened to expose the honey containing frames. The hive is smoked to calm the bees. A blower is sometimes used to remove bees from the frames. The frames are removed from the hive and transported to a processing centre. The cells in the frame need to be uncapped by removing the wax cap. This can be done using an uncapping fork or an uncapping knife. The frames then need to be spun to remove the honey from the cells by centrifugal action. After the honey is removed, the frames are taken back to the hive and replaced (or new frames are inserted). It is estimated that the above time-consuming steps constitute approximately 90% of the beekeeper's time required to collect honey from the hive.

Conventional collecting techniques require the provision of a honey shed, an extracting machine, and sometimes an automatic de-capping machine.

Another disadvantage is that the hive can be quite damaged during the honey collecting process (also called the robbing process). For instance, bees use 7 kg of honey to make 1 kg of wax.

The existing process greatly disturbs the bees, and many bees may die during honey collection. Also, there is always the annoyance (and sometimes potential danger) in bee stings during the robbing process of the hive.

With the traditional process, the hive can only be robbed at certain times such as daylight, no rain, no high winds, etc and therefore there are often restrictions and limitations on the times when the hive can be opened to collect the honeycombs.

Furthermore, traditional hives leave spaces for ingress of pests and diseases.

It is known to transport beehives from one location to another location. With the general demise of bee numbers in agricultural areas, it is becoming more common for farmers to request beehives to be placed on their farms to improve pollination. This then involves transporting honeycomb frames to and from a honey shed over very long distances. Directly extracting honey to a large tank next to the hives on the farm site without having to remove and transport honeycomb frames would save significant time and cost.

Therefore, it would be advantageous to provide apparatus which removes honey from a hive without having to open the hive. This would overcome at least some of the above-mentioned disadvantages and provide a useful or commercial choice. It would be particularly desirable to enable honey to be efficiently removed from a honeycomb without needing to remove the honeycomb from the hive.

Disclosed is a method and apparatus for extracting honey by melting in-hive wax honeycomb to form vertical tunnels or pathways using wires or plates embedded into or forming part of the comb and heated by passing electricity through them. This will allow the removal of honey directly from the hive without opening the hive. This has the advantage of removing honey from a hive without having to open the hive. This would overcome at least some of the abovementioned disadvantages and provide a useful or commercial choice. A preferred object is to enable honey to be efficiently removed from a honeycomb without needing to remove the honeycomb from the hive.

Wires are placed in the wax honeycomb matrix in such a way that, when these wires are heated, they form vertical tunnels in the centre of the comb allowing honey to drain from every cell that connects to each tunnel.

Each tunnel or honey pathway will open at its base to a pipe or gutter so that honey can be conveyed to the outside of the hive.

The Honeycomb frame with embedded wires may have any number of shapes and sizes; parallelogram, hexagonal, etc. including decorative designs to appeal to the hobbyist beekeeper. However, it will be preferred to use similar dimensions to traditional beehive frames enabling this invention to be compatible with existing hives.

The honeycomb may be made out of any suitable materials including but not limited to plastics, reinforced plastics, fibreglass, metals, wire, silicones, rubbers, wax, wax made by the bees, carbon fibres and the like.

A plurality of single 'heating' wires run from the top of a honeycomb frame to a pipe or gutter at the base of the comb.

ASPECT 1: Each wire, when heated may melt the surrounding wax which forms a tunnel in the wax around it therefore making a passageway for honey to flow downwards to the pipe, gutter or collection area.

ASPECT 2: A plurality of single 'heating' wires run from the top of a honeycomb frame to a pipe or gutter at the base of the comb. Each wire is able to move back and forth in a horizontal plane or in a circular pattern in a horizontal plane so that a larger tunnel is formed than described in Aspect 1.

The movement in the wire can be accomplished with magnetic devices, bi-metallic strips, motors, pneumatic, hydraulic or any applicable means to create movement.

ASPECT 3: Two, three, four or more wires are arranged to form a tunnel between them. Regular spacers are used to hold the wires in position. When heated, the wires together melt the wax and form the vertical honey tunnel.

ASPECT 4: The wires form part of the shape of the honeycomb cells. The bees then build wax comb with the wires guiding the construction of the comb. When heated, these parts of the cell walls melt away creating tunnels or pathways through the comb for honey to flow down to a collecting trough at the bottom.

ASPECT 5: Each vertical wire forms a long coil so that, when heated a tunnel is formed inside the spiral.

ASPECT 6: The common wall between two opposing arrays of honeycomb cells is heated to remove the rear of each cell wall allowing a space for honey to flow down to a collecting trough at the bottom. This wall could be a heated wire structure, a mesh or a complete plate of metal.

ASPECT 7: All the walls of the honeycomb cells are made of wax and heating wires are places in such a way that all cell walls are melted allowing the honey to flow down to a collection area below. It may be advantageous for the mouth of the cells to remain, so the bees are not disturbed. This could be achieved by not melting the mouth area and/or the mouth area being made of another material including but not limited to plastic, silicon metal, wire, wood, glass, fibreglass, resin and the like.

Features that Apply to any or all of the Above Aspects

The tunnel diameter is determined by the size of the wire or wires and the temperature of the wire when electricity is applied to it. It is envisioned, but not limited to, that the tunnel diameter would be approximately one half the size of a honeycomb cell.

Each tunnel can be formed in the central wall or foundation of the honeycomb. This allows opposing cells to be drained to the same tunnel.

The frames may be made of a transparent material, such as, but not limited to, clear plastics. When a clear material is used to form one end of a frame, and this frame forms all or part of the end of the Honey Super, easy visual inspection of the honey comb and bees is enabled. Looking at the honeycomb, end-on, through a transparent frame allows a beekeeper to see whether the comb is full and capped. This then would indicate that the honeycomb is ready for extraction of the honey. A video or stills camera can be mounted so that the images can be conveyed to remote locations at any time.

The frames may have provision for embedded or inserted cameras and lighting units.

The heat-able wires may be combined with plastic preformed honey comb in a variety of arrangements whereby the plastic (or any other suitable material) comb locates the wires and guides the bee's in building the wax part of the comb. A non-limiting example of this would be the wires being embedded in the wax that forms the foundation of the comb at the rear of the cells and plastic forming the upper part of the cell walls. When heated, part of the foundation at the bottom of the cells melts allowing honey to flow downward to a pipe or channel. Another non-limiting example is the upper and lower walls of the honey comb cells being formed of a wire structure that the bees can complete with wax. The remaining cell walls can be made of plastic.

When the wire is heated, the upper and lower wax walls melt forming channels in the comb for honey to flow down to a collection area.

The wires may be made of nickel-chromium, stainless steel or any other metal.

The wires may be single strand, may be composed of a number of strands separated by regular 'spacers', or may be coiled to enable the forming of a tunnel of sufficient size to convey the honey.

The wires forming the tunnels will be heated to a specific temperature allowing the wax to melt but not 'burning' or spoiling the honey. This temperature may be regulated with thermostats connected to current regulating equipment.

The top of the wires forming the tunnels may attach to the upper member of the honeycomb frame and the bottom of the wires to the conductors embedded in or around the pipe or gutter at the base of the honeycomb. Alternatively, the wires may form a circuit by passing through the comb and back again so electrical connections may only need to be accessed on one side of the frame.

The frames supporting the wires and honeycomb may be made of wood, plastics or any other suitable material. As detailed in another provisional patent by the same inventors, the frames may be made from transparent material so as to allow end-on viewing of the honeycomb. This end-on view can be undertaken without opening the hive or disturbing the bees and gives a beekeeper a variety of information including whether the honeycomb has been capped and is therefore ready for honey removal.

The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A frame for a beehive comprising:
   a pair of opposite frame sidewalls extending across a width dimension of the frame, the frame having a length dimension extending between the pair of opposite frame sidewalls; and
   a plurality of fixed first sections and a plurality of moveable second sections laterally stacked between the frame sidewalls and configured to define an artificial honeycomb comprising a plurality of honeycomb cells, wherein:
   the first and second sections are oriented parallel with the frame sidewalls and alternately arranged along the length dimension of the frame,
   the second sections are laterally slidable relative to the first sections between an open position for release of honey from the plurality of honeycomb cells and a closed position for storage of honey in the plurality of honeycomb cells,
   each of the first sections comprises a first series of honeycomb cell portions of the artificial honeycomb and each of second sections comprises a second series of honeycomb cell portions of the artificial honeycomb, wherein the first series of honeycomb cell portions and the second series of honeycomb cell portions are arranged in opposed pairs;
   each of the first series of honeycomb cell portions and each of the second series of honeycomb cell portions respectively comprises a pair of outer longitudinal cell edges and a cell wall extending therebetween configured to be arranged in registration with each other when in the closed position to form the plurality of honeycomb cells for the storage of the honey;
   at least one of the pair of outer longitudinal cell edges of each of the plurality of honeycomb cells is non-contiguous and shaped to define a space relative to a counterpart and opposed cell edge of the pair of outer longitudinal cell edges to avoid catching a limb of a bee when moving from the open position to the closed position; and
   the space is selected from the group consisting of an outwardly diverging space, an inwardly diverging space, a V-cut taper, a round cut taper, a stepped cut taper, and a partial cut taper.

2. The frame of claim 1, wherein the plurality of honeycomb cells are split longitudinally along a vertical plane parallel to the frame sidewalls, such that movement of the second sections relative to the first sections into the open position vertically translates the second series of honeycomb cell portions relative to the first series of honeycomb cell portions and causes honey to flow laterally downwards from each of the split honeycomb cells.

3. The frame of claim 1, wherein the plurality of honeycomb cells have a length dimension extending at least partially across the width dimension of the frame.

4. The frame of claim 1, wherein bees fills the space with wax so that honey can be contained within the plurality of formed said honeycomb cells.

5. The frame of claim 1, wherein a length of the at least one of the pair of outer longitudinal cell edges is different than a length of the counterpart and opposed cell edge of the pair of outer longitudinal cell edges.

6. The frame of claim 1, wherein the at least one of the pair of outer longitudinal cell edges of each of the plurality of honeycomb cells is angled relative to the counterpart and opposed cell edge of the pair of outer longitudinal cell edges to define the space therebetween.

7. The frame of claim 1, wherein each of the first sections comprises a head and a foot and wherein the first series of honeycomb cell portions is disposed between the head and the foot.

8. The frame of claim 7, wherein the foot comprises a trough segment to receive honey falling from said split honeycomb cells when in the open position.

9. The frame of claim 8, wherein the head of each of the first sections comprises mating formations on opposed sides thereof for mating with corresponding adjacent ones of the first sections.

10. The frame of claim 7, wherein the foot of each of the first sections comprises mating formations on opposed sides thereof for mating with corresponding adjacent ones of the first sections.

11. The frame of claim 7, wherein each of the second sections comprises a head.

12. The frame of claim 11, wherein the heads of the first sections each define a first slot and the heads of the second sections each define a second slot and wherein the heads of the second section are narrower than the heads of the first section, and wherein the heads of the second sections are disposed across the first slots.

13. The frame of claim 12, wherein the second sections are laterally slidable by inserting a tool with an elongate shaft and an operating handle into aligned said first slots and second slots and rotating the elongate shaft to laterally slide the second sections relative to the first sections.

\* \* \* \* \*